US008412518B2

(12) United States Patent
Villemoes

(10) Patent No.: US 8,412,518 B2
(45) **Date of Patent: *Apr. 2, 2013**

(54) TIME WARPED MODIFIED TRANSFORM CODING OF AUDIO SIGNALS

(75) Inventor: Lars Villemoes, Jaerfaella (SE)

(73) Assignee: Dolby International AB, Amsterdam Zuid-Oost (NL)

( * ) Notice: Subject to any disclaimer, the term of this patent is extended or adjusted under 35 U.S.C. 154(b) by 416 days.

This patent is subject to a terminal disclaimer.

(21) Appl. No.: 12/697,137

(22) Filed: Jan. 29, 2010

(65) Prior Publication Data

US 2010/0204998 A1 Aug. 12, 2010

Related U.S. Application Data

(62) Division of application No. 11/464,176, filed on Aug. 11, 2006, now Pat. No. 7,720,677.

(60) Provisional application No. 60/733,512, filed on Nov. 3, 2005.

(51) Int. Cl.

| | |
|---|---|
| ***G10L 11/04*** | (2006.01) |
| ***G10L 21/04*** | (2006.01) |
| ***G10L 15/00*** | (2006.01) |
| ***G10L 19/02*** | (2006.01) |
| ***G10L 19/14*** | (2006.01) |
| ***G10L 13/06*** | (2006.01) |
| ***G10L 13/08*** | (2006.01) |
| ***G10L 19/00*** | (2006.01) |

(52) U.S. Cl. ........ 704/207; 704/503; 704/241; 704/205; 704/204; 704/267; 704/260; 704/219

(58) Field of Classification Search .................. 704/207, 704/503, 241, 205, 204, 267, 260, 219

See application file for complete search history.

(56) References Cited

U.S. PATENT DOCUMENTS (Continued)

FOREIGN PATENT DOCUMENTS

| | | |
|---|---|---|
| CN | 101819778 | 9/2010 |
| CN | 101819779 | 9/2010 |

(Continued)

OTHER PUBLICATIONS

Yang Gao; Benyassine, A.; Thyssen, J.; Huan-yu Su; Shlomot, E.;, "eX-CELP: a speech coding paradigm," Acoustics, Speech, and Signal Processing, 2001. Proceedings. (ICASSP '01). 2001 IEEE International Conference on, vol. 2, No., pp. 689-692 vol. 2, 2001.*

(Continued)

*Primary Examiner* — Edgar Guerra-Erazo
(74) *Attorney, Agent, or Firm* — Glenn Patent Group; Michael A. Glenn

(57) ABSTRACT

A representation of an audio signal having a first frame, a second frame following the first frame, and a third frame following the second frame, is derived by estimating first warp information for the first and the second frame and second warp information for the second frame and the third frame, the warp information describing a pitch information of the audio signal. First spectral coefficients for the first and the second frame are derived using the first warp information and a first weighted representation of the first and the second frame, the first weighted representation derived by applying a first window function to the first and the second frames, wherein the first window function depends on the first warp information. Second spectral coefficients for the second and the third frame are derived using the second warp information and a second weighted representation of the second and the third frame, the second weighted representation derived by applying a second window function to the second and the third frames, wherein the second window function depends on the second warp information. The representation of the audio signal is generated including the first and the second spectral coefficients.

36 Claims, 14 Drawing Sheets

U.S. PATENT DOCUMENTS

| | | | | |
|---|---|---|---|---|
| 6,169,970 | B1 | 1/2001 | Klejin | |
| 6,182,042 | B1 * | 1/2001 | Peevers | 704/269 |
| 6,879,955 | B2 * | 4/2005 | Rao | 704/241 |
| 6,959,274 | B1 * | 10/2005 | Gao et al. | 704/219 |
| 6,978,241 | B1 | 12/2005 | Sluijter et al. | |
| 7,024,358 | B2 | 4/2006 | Shlomot et al. | |
| 7,433,463 | B2 | 10/2008 | Alves et al. | |
| 7,519,528 | B2 | 4/2009 | Liu et al. | |
| 7,555,434 | B2 | 6/2009 | Nomura et al. | |
| 7,676,362 | B2 * | 3/2010 | Boillot et al. | 704/209 |
| 7,917,561 | B2 | 3/2011 | Ekstrand et al. | |
| 8,005,678 | B2 * | 8/2011 | Zopf et al. | 704/267 |
| 8,024,192 | B2 * | 9/2011 | Zopf et al. | 704/267 |
| 8,195,465 | B2 * | 6/2012 | Zopf et al. | 704/267 |
| 2001/0021904 | A1 * | 9/2001 | Plumpe | 704/209 |
| 2002/0120445 | A1 | 8/2002 | Vafin et al. | |
| 2002/0177997 | A1 * | 11/2002 | Le-Faucheur et al. | 704/208 |
| 2005/0131681 | A1 | 6/2005 | Rao | |
| 2005/0249272 | A1 * | 11/2005 | Kirkeby et al. | 375/232 |
| 2006/0149532 | A1 * | 7/2006 | Boillot et al. | 704/203 |
| 2006/0206334 | A1 | 9/2006 | Kapoor et al. | |
| 2007/0174056 | A1 | 7/2007 | Sato | |
| 2008/0033585 | A1 * | 2/2008 | Zopf | 700/94 |
| 2008/0046237 | A1 * | 2/2008 | Zopf et al. | 704/228 |
| 2008/0046252 | A1 * | 2/2008 | Zopf et al. | 704/501 |
| 2008/0052065 | A1 * | 2/2008 | Kapoor et al. | 704/221 |

FOREIGN PATENT DOCUMENTS

| | | | |
|---|---|---|---|
| CN | 101819780 | | 9/2010 |
| EP | 1271471 | A2 | 1/2003 |
| JP | 1233835 | | 9/1989 |
| JP | 05-046199 | | 2/1993 |
| JP | 07-084597 | | 3/1995 |
| JP | 2003-122400 | | 4/2003 |
| JP | 2003-177799 | | 6/2003 |
| TW | 448417 | | 8/2001 |
| TW | 525354 | | 3/2003 |
| WO | WO 98/06090 | A1 | 2/1998 |
| WO | WO 00/74039 | | 12/2000 |

OTHER PUBLICATIONS

Int'l Search Report and Written Opinion, mailed Jan. 9, 2007, in related European patent application PCT/EP2006/010246, 9 pages.

Painter et al., "Perceptual Coding of Digital Audio", *Proceedings of the IEEE*, vol. 88, No. 4, pp. 451-513 (Apr. 2000).

Yang, et al.; "Pitch Synchronous Modulated Lapped Transform of the Linear Prediction Residual of Speech", Oct. 1998; *Proceedings of ICSP* '98, pp. 591-594.

Sluijter et al. Philips Research Laboratories, "A Time Warper for Speech Signals", Jun. 1999; IEEE Workshop on Speech Coding; 3 pgs.

Unser et al., "B-Spline Signal Processing: Part II-Efficient Design and Applications", *IEEE Transactions on Signal Processing*, vol. 41, No. 2, pp. 834-848 (Feb. 1993).

"Local Trigonometric Transforms", *Adapted Wavelet Analysis from Theory to Software*, ISBN 1-56881-041-5, Chapter 4, pp. 103-152 (1994).

Klejin, et al.; "Interpolation of the pitch-predictor parameters in analysis-by-synthesis speech coders"; Jan. 1994; IEEE Trans. on Speech and Audio Processing, vol. 2, No. 1, part1, pp. 42-54.

Goldenstein, et al.; "Time warping of audio signals"; Jul. 1999; In Proc. of Computer Graphics International—CGI '99; 6 pages.

Muralishankar, et al.; "Modification of pitch using DCT in the source domain"; Feb. 2004; Speech Communication, vol. 42, pp. 143-154.

Taori, et al.; "Speech compression using pitch synchronous interpolation"; May 1995; In Proc. Int. Conf. on Acoustics, Speech and Signal Proc., vol. 1, pp. 512-515.

Weruaga, et al.; "Speech analysis with the Fast Chirp Transform"; Sep. 7-10, 2004; 12th European Signal Processing Conf., pp. 1011-1014, Vienna, Austria; retrieved from the Internet on Feb. 1, 2011; url: http://www.eurasip.org/Proceedings/Eusipco/Wusipco2004/defevent/papers/cr1374.pdf.

Weruaga, et al.; "Speech Analysis with the Short-Time Chirp Transform"; Sep. 1, 2003; Eurospeech 2003, pp. 53-56.

Int'l Search Report and Written Opinion, mailed Feb. 28, 2011, in related European patent application EP10183308, 11 pages.

* cited by examiner

TIME WARPED MODIFIED TRANSFORM CODING OF AUDIO SIGNALS

CROSS-REFERENCE TO RELATED APPLICATION

This application is a divisional of U.S. patent application Ser. No. 11/464,176 filed on Aug. 11, 2006 now U.S. Pat. No. 7,720,677, which claims the benefit of U.S. application Ser. No. 60/733,512 filed on Nov. 3, 2005, which are incorporated herein by this reference thereto.

FIELD OF THE INVENTION

The present invention relates to audio source coding systems and in particular to audio coding schemes using block-based transforms.

BACKGROUND OF THE INVENTION AND PRIOR ART

Several ways are known in the art to encode audio and video content. Generally, of course, the aim is to encode the content in a bit-saving manner without degrading the reconstruction quality of the signal.

Recently, new approaches to encode audio and video content have been developed, amongst which transform-based perceptual audio coding achieves the largest coding gain for stationary signals, that is when large transform sizes, can be applied. (See for example T. Painter and A. Spanias: "Perceptual coding of digital audio", Proceedings of the IEEE, Vol. 88, No. 4, April 2000, pages 451-513). Stationary parts of audio are often well modelled by a fixed finite number of stationary sinusoids. Once the transform size is large enough to resolve those components, a fixed number of bits is required for a given distortion target. By further increasing the transform size, larger and larger segments of the audio signal will be described without increasing the bit demand. For non-stationary signals, however, it becomes necessary to reduce the transform size and thus the coding gain will decrease rapidly. To overcome this problem, for abrupt changes and transient events, transform size switching can be applied without significantly increasing the mean coding cost. That is, when a transient event is detected, the block size (frame size) of the samples to be encoded together is decreased. For more persistently transient signals, the bit rate will of course increase dramatically.

A particular interesting example for persistent transient behaviour is the pitch variation of locally harmonic signals, which is encountered mainly in the voiced parts of speech and singing, but can also originate from the vibratos and glissandos of some musical instruments. Having a harmonic signal, i.e. a signal having signal peaks distributed with equal spacing along the time axis, the term pitch describes the inverse of the time between adjacent peaks of the signal. Such a signal therefore has a perfect harmonic spectrum, consisting of a base frequency equal to the pitch and higher order harmonics. In more general terms, pitch can be defined as the inverse of the time between two neighbouring corresponding signal portions within a locally harmonic signal. However, if the pitch and thus the base frequency varies with time, as it is the case in voiced sounds, the spectrum will become more and more complex and thus more inefficient to encode.

A parameter closely, related to the pitch of a signal is the warp of the signal. Assuming that the signal at time t has pitch equal to p(t) and that this pitch value varies smoothly over time, the warp of the signal at time t is defined by the logarithmic derivative $$a(t) = \frac{p'(t)}{p(t)}.$$

For a harmonic signal, this definition of warp is insensitive to the particular choice of the harmonic component and systematic errors in terms of multiples or fractions of the pitch. The warp measures a change of frequency in the logarithmic domain. The natural unit for warp is Hertz [Hz], but in musical terms, a signal with constant warp $a(t)=a_0$ is a sweep with a sweep rate of $a_0/\log 2$ octaves per second [oct/s]. Speech signals exhibit warps of up to 10 oct/s and mean warp around 2 oct/s.

As typical frame length (block length) of transform coders are so big, that the relative pitch change is significant within the frame, warps or pitch variations of that size lead to a scrambling of the frequency analysis of those coders. As, for a required constant bit rate, this can only be overcome by increasing the coarseness of quantization, this effect leads to the introduction of quantization noise, which is often perceived as reverberation.

One possible technique to overcome this problem is time warping. The concept of time-warped coding is best explained by imagining a tape recorder with variable speed. When recording the audio signal, the speed is adjusted dynamically so as to achieve constant pitch over all voiced segments. The resulting locally stationary audio signal is encoded together with the applied tape speed changes. In the decoder, playback is then performed with the opposite speed changes. However, applying the simple time warping as described above has some significant drawbacks. First of all, the absolute tape speed ends up being uncontrollable, leading to a violation of duration of the entire encoded signal and bandwidth limitations. For reconstruction, additional side information on the tape speed (or equivalently on the signal pitch) has to be transmitted, introducing a substantial bit-rate overhead, especially at low bit-rates.

The common approach of prior art methods to overcome the problem of uncontrollable duration of time-warped signals is to process consecutive non-overlapping segments, i.e. individual frames, of the signal independently by a time warp, such that the duration of each segment is preserved. This approach is for example described in Yang et. al. "Pitch synchronous modulated lapped transform of the linear prediction residual of speech", Proceedings of ICSP '98, pages 591-594. A great disadvantage of such a proceeding is that although the processed signal is stationary within segments, the pitch will exhibit jumps at each segment boundary. Those jumps will evidently lead to a loss of coding efficiency of the subsequent audio coder and audible discontinuities are introduced in the decoded signal.

Time warping is also implemented in several other coding schemes. For example, US-2002/0120445 describes a scheme, in which signal segments are subject to slight modifications in duration prior to block-based transform coding. This is to avoid large signal components at the boundary of the blocks, accepting slight variations in duration of the single segments.

Another technique making use of time warping is described in U.S. Pat. No. 6,169,970, where time warping is applied in order to boost the performance of the long-term predictor of a speech encoder. Along the same lines, in US 2005/0131681, a pre-processing unit for CELP coding of speech signals is described which applies a piecewise linear warp between non-overlapping intervals, each containing one whitened pitch pulse. Finally, it is described in (R. J. Sluijter and A. J. E. M. Janssen, "A time warper for speech signals" IEEE workshop on Speech Coding '99, June 1999, pages 150-152) how to improve on speech pitch estimation by application of a quadratic time warping function to a speech frame.

Summarizing, prior art warping techniques share the problems of introducing discontinuities at frame borders and of requiring a significant amount of additional bit rate for the transmission of the parameters describing the pitch variation of the signal.

SUMMARY OF THE INVENTION

It is the object of this invention to provide a concept for a more efficient coding of audio signals using time warping.

In accordance with a first aspect of the present invention, this object is achieved by an encoder for deriving a representation of an audio signal having a first frame, a second frame following the first frame, and a third frame following the second frame, the encoder comprising: a warp estimator for estimating first warp information for the first and the second frame and for estimating second warp information for the second frame and the third frame, the warp information describing a pitch of the audio signal; a spectral analyzer for deriving first spectral coefficients for the first and the second frame using the first warp information and for deriving second spectral coefficients for the second and the third frame using the second warp information; and an output interface for outputting the representation of the audio signal including the first and the second spectral coefficients.

In accordance with a second aspect of the present invention, this object is achieved by a decoder for reconstructing an audio signal having a first frame, a second frame following the first frame and a third frame following the second frame, using first warp information, the first warp information describing a pitch of the audio signal for the first and the second frame, second warp information, the second warp information describing a pitch of the audio signal for the second and the third frame, first spectral coefficients for the first and the second frame and second spectral coefficients for the second and the third frame, the decoder comprising: a spectral value processor for deriving a first combined frame using the first spectral coefficients and the first warp information, the first combined frame having information on the first and on the second frame; and for deriving a second combined frame using the second spectral coefficients and the second warp information, the second combined frame having information on the second and the third frame; and a synthesizer for reconstructing the second frame using the first combined frame and the second combined frame.

In accordance with a third aspect of the present invention, this object is achieved by method of deriving a representation of an audio signal having a first frame, a second frame following the first frame, and a third frame following the second frame, the method comprising: estimating first warp information for the first and the second frame and for estimating second warp information for the second frame and the third frame, the warp information describing a pitch of the audio signal; deriving first spectral coefficients for the first and the second frame using the first warp information and for deriving second spectral coefficients for the second and the third frame using the second warp information; and outputting the representation of the audio signal including the first and the second spectral coefficients.

In accordance with a fourth aspect of the present invention, this object is achieved by a method of reconstructing an audio signal having a first frame, a second frame following the first frame and a third frame following the second frame, using first warp information, the first warp information describing a pitch of the audio signal for the first and the second frame, second warp information, the second warp information describing a pitch of the audio signal for the second and the third frame, first spectral coefficients for the first and the second frame and second spectral coefficients for the second and the third frame, the method comprising: deriving a first combined frame using the first spectral coefficients and the first warp information, the first combined frame having information on the first and on the second frame; and deriving a second combined frame using the second spectral coefficients and the second warp information, the second combined frame having information on the second and the third frame; and reconstructing the second frame using the first combined frame and the second combined frame.

In accordance with a fifth aspect of the present invention, this object is achieved by a representation of an audio signal having a first frame, a second frame following the first frame and a third frame following the second frame, the representation comprising first spectral coefficients for the first and the second frame, the first spectral coefficients describing the spectral composition of a warped representation of the first and the second frame; and second spectral coefficients describing a spectral composition of a warped representation of the second and the third frame.

In accordance with a sixth aspect of the present invention, this is achieved by a computer program having a program code for performing, when running on a computer, any of the above methods.

The present invention is based on the finding that a spectral representation of an audio signal having consecutive audio frames can be derived more efficiently when a common time warp is estimated for any two neighbouring frames, such that a following block transform can additionally use the warp information.

Thus, window functions required for successful application of an overlap and add procedure during reconstruction can be derived and applied, already anticipating the re-sampling of the signal due to the time warping. Therefore, the increased efficiency of block-based transform coding of time-warped signals can be used without introducing audible discontinuities.

The present invention thus offers an attractive solution to the prior art problems. On the one hand, the problem related to the segmentation of the audio signal is overcome by a particular overlap and add technique, that integrates the time-warp operations with the window operation and introduces a time offset of the block transform. The resulting continuous time transforms have perfect reconstruction capability and their discrete time counterparts are only limited by the quality of the applied resampling technique of the decoder during reconstruction. This property results in a high bit rate convergence of the resulting audio coding scheme. It is principally possible to achieve lossless transmission of the signal by decreasing the coarseness of the quantization, that is by increasing the transmission bit rate. This can, for example, not be achieved with purely parametric coding methods.

A further advantage of the present invention is a strong decrease of the bit rate demand of the additional information required to be transmitted for reversing the time warping.

This is achieved by transmitting warp parameter side information rather than pitch side information. This has the further advantage that the present invention exhibits only a mild degree of parameter dependency as opposed to the critical dependence on correct pitch detection for many pitch-parameter based audio coding methods. This is since pitch parameter transmission requires the detection of the fundamental frequency of a locally harmonic signal, which is not always easily achievable. The scheme of the present invention is therefore highly robust, as evidently detection of a higher harmonic does not falsify the warp parameter to be transmitted, given the definition of the warp parameter above.

In one embodiment of the present invention, an encoding scheme is applied to encode an audio signal arranged in consecutive frames, and in particular a first, a second, and a third frame following each other. The full information on the signal of the second frame is provided by a spectral representation of a combination of the first and the second frame, a warp parameter sequence for the first and the second frame as well as by a spectral representation of a combination of the second and the third frame and a warp parameter sequence for the second and the third frame. Using the inventive concept of time warping allows for an overlap and add reconstruction of the signal without having to introduce rapid pitch variations at the frame borders and the resulting introduction of additional audible discontinuities.

In a further embodiment of the present invention, the warp parameter sequence is derived using well-known pitch-tracking algorithms, enabling the use of those well-known algorithms and thus an easy implementation of the present invention into already existing coding schemes.

In a further embodiment of the present invention, the warping is implemented such that the pitch of the audio signal within the frames is as constant as possible, when the audio signal is time warped as indicated by the warp parameters.

In a further embodiment of the present invention, the bit rate is even further decreased at the cost of higher computational complexity during encoding when the warp parameter sequence is chosen such that the size of an encoded representation of the spectral coefficients is minimized.

In a further embodiment of the present invention, the inventive encoding and decoding is decomposed into the application of a window function (windowing), a resampling and a block transform. The decomposition has the great advantage that, especially for the transform, already existing software and hardware implementations may be used to efficiently implement the inventive coding concept. At the decoder side, a further independent step of overlapping and adding is introduced to reconstruct the signal.

In an alternative embodiment of an inventive decoder, additional spectral weighting is applied to the spectral coefficients of the signal prior to transformation into the time domain. Doing so has the advantage of further decreasing the computational complexity on the decoder side, as the computational complexity of the resampling of the signal can thus be decreased.

The term "pitch" is to be interpreted in a general sense. This term also covers a pitch variation in connection with places that concern the warp information. There can be a situation, in which the warp information does not give access to absolute pitch, but to relative or normalized pitch information. So given a warp information one may arrive at a description of the pitch of the signal, when one accepts to get a correct pitch curve shape without values on the y-axis.

BRIEF DESCRIPTION OF THE DRAWINGS

Preferred embodiments of the present invention are subsequently described by referring to the enclosed drawings, wherein.

DETAILED DESCRIPTION OF PREFERRED EMBODIMENTS

Figure 1:
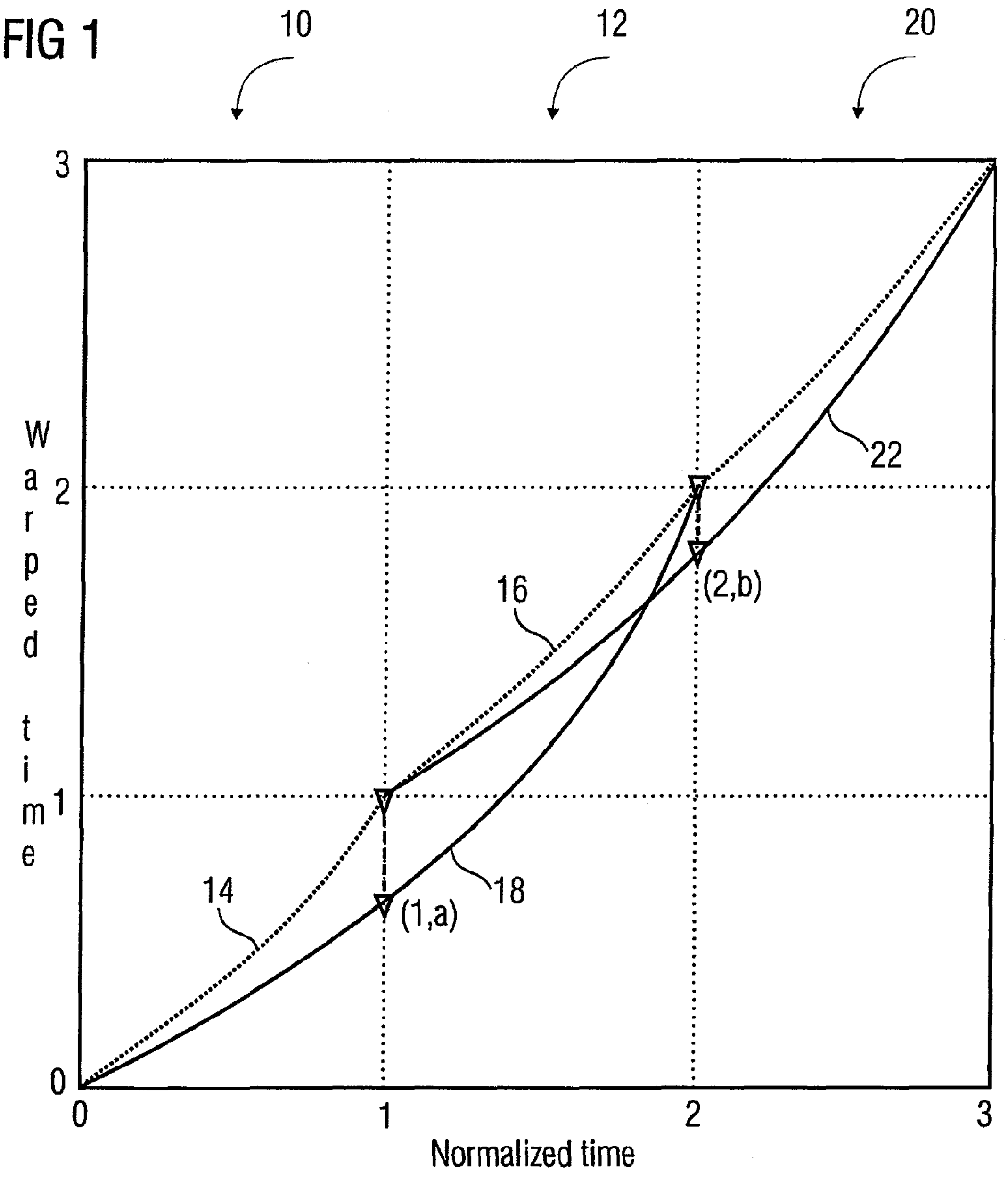
FIG. 1 shows an example of inventive warp maps.

The embodiments described below are merely illustrative for the principles of the present invention for time warped transform coding of audio signals. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

In the following, basic ideas and concepts of warping and block transforms are shortly reviewed to motivate the inventive concept, which will be discussed in more detail below, making reference to the enclosed figures.

Generally, the specifics of the time-warped transform are easiest to derive in the domain of continuous-time signals. The following paragraphs describe the general theory, which will then be subsequently specialized and converted to its inventive application to discrete-time signals. The main step in this conversion is to replace the change of coordinates performed on continuous-time signals with non-uniform resampling of discrete-time signals in such a way that the mean sample density is preserved, i.e. that the duration of the audio signal is not altered.

Let $s=\psi(t)$ describe a change of time coordinate described by a continuously differentiable strictly increasing function $\psi$, mapping the t-axis interval I onto the s-axis interval J.

$\psi(t)$ is therefore a function that can be used to transform the time-axis of a time-dependent quantity, which is equivalent to a resampling in the time discrete case. It should be noted that in the following discussion, the t-axis interval I is an interval in the normal time-domain and the x-axis interval J is an interval in the warped time domain.

Given an orthonormal basis $\{v_\alpha\}$ for signals of finite energy on the interval J, one obtains an orthonormal basis $\{u_\alpha\}$ for signals of finite energy on the interval I by the rule $$u_\alpha(t)=\psi'(t)^{1/2}v_\alpha(\psi(t)). \quad (1)$$

Given an infinite time interval I, local specification of time warp can be achieved by segmenting I and then constructing $\psi$ by gluing together rescaled pieces of normalized warp maps.

A normalized warp map is a continuously differentiable and strictly increasing function which maps the unit interval [0,1] onto itself. Starting from a sequence of segmentation points $t=t_k$ where $t_{k+1}>t_k$, and a corresponding sequence of normalized warp maps $\psi_k$, one constructs $$\psi(t) = d_k \psi_k\left(\frac{t - t_k}{t_{k+1} - t_k}\right) + s_k,\ t_k \le t \le t_{k+1}, \tag{2}$$

where $d_k=s_{k+1}-s_k$ and the sequence $d_k$ is adjusted such that $\psi(t)$ becomes continuously differentiable. This defines $\psi(t)$ from the sequence of normalized warp maps $\psi_k$ up to an affine change of scale of the type $A\psi(t)+B$.

Let $\{v_{k,n}\}$ be an orthonormal basis for signals of finite energy on the interval J, adapted to the segmentation $s_k=\psi(t_k)$, in the sense that there is an integer K, the overlap factor, such that $v_{k,n}(s)=_0$ if $s<s_k$ or $s>s_{k+K}$.

The present invention focuses on cases K 2, since the case K=1 corresponds to the prior art methods without overlap. It should be noted that not many constructions are presently known for $K\geqq3$. A particular example for the inventive concept will be developed for the case K=2 below, including local trigonometric bases that are also used in modified discrete cosine transforms (MDCT) and other discrete time lapped transforms.

Let the construction of $\{v_{k,n}\}$ from the segmentation be local, in the sense that there is an integer p, such that $v_{k,n}(s)$ does not depend on $s_l$ for l<k−pl>k+K+p. Finally, let the construction be such that an affine change of segmentation to $As_k+B$ results in a change of basis to $A^{-1/2}v_{k,n}((s-B)/A)$. Then $$u_{k,n}(t)=\psi'(t)^{1/2}v_{k,n}(\psi(t)) \tag{3}$$

is a time-warped orthonormal basis for signals of finite energy on the interval I, which is well defined from the segmentation points $t_k$ and the sequence of normalized warp maps $\psi_k$, independent of the initialization of the parameter sequences $s_k$ and $d_k$ in (2). It is adapted to the given segmentation in the sense that $u_{k,n}(t)=0$ if $t<t_k$ or $t>t_{k+K}$, and it is locally defined in the sense that $u_{k,n}(t)$ depends neither on $t_l$ for l<k−p or l>k+K+p, nor on the normalized warp maps $\psi_l$ for l<k−p or $l\geqq k+K+p$.

The synthesis waveforms (3) are continuous but not necessarily differentiable, due to the Jacobian factor $(\psi''(t))_{1/2}$. For this reason, and for reduction of the computational load in the discrete-time case, a derived biorthogonal system can be constructed as well. Assume that there are constants $0<C_1<C_2$ such that $$C_1\eta_k \leqq \psi'(t) \leqq C_2\eta_k,\ t_k \leqq t \leqq t_{k+K} \tag{4}$$

for a sequence $\eta_k>0$. Then $$\left\{\begin{array}{c} f_{k,n}(t) = \eta_k^{1/2} v_{k,n}(\psi(t)); \\ g_{k,n}(t) = \psi'(t)\eta_k^{-1/2} v_{k,n}(\psi(t)). \end{array}\right\} \tag{5}$$

defines a biorthogonal pair if of Riesz bases for the space of signals of finite energy on the interval I.

Thus, $f_{k,n}(t)$ as well as $g_{k,n}(t)$ may be used for analysis, whereas it is particularly advantageous to use $f_{k,n}(t)$ as synthesis waveforms and $g_{k,n}(t)$ as analysis waveforms.

Based on the general considerations above, an example for the inventive concept will be derived in the subsequent paragraphs for the case of uniform segmentation $t_k=k$ and overlap factor K=2, by using a local cosine basis adapted to the resulting segmentation on the s-axis.

It should be noted that the modifications necessary to deal with non-uniform segmentations are obvious such that the inventive concept is as well applicable to such non-uniform segmentations. As for example proposed by M. W. Wickerhauser, "Adapted wavelet analysis from theory to software", A. K. Peters, 1994, Chapter 4, a starting point for building a local cosine basis is a rising cutoff function $\rho$ such that $\rho(r)=0$ for $r<-1$, $\rho(r)=1$ for $r>1$, and $\rho(r)^2+\rho(-r)=1$ in the active region $-1\leqq r\leqq 1$.

Given a segmentation $s_k$, a window on each interval $s_k\leqq s\leqq s_{k+2}$ can then be constructed according to $$w_k(s) = \rho\left(\frac{s - c_k}{\varepsilon_k}\right)\rho\left(\frac{c_{k+1} - s}{\varepsilon_{k+1}}\right), \tag{6}$$

with cutoff midpoints $c_k=(s_k+s_{k+1})/2$ and cutoff radii $\epsilon_k=(s_{k+1}-s_k)/2$. This corresponds to the middle point construction of Wickerhauser.

With $l_k=c_{k+1}-c_k=\epsilon_k+\epsilon_{k+1}$, an orthornormal basis results from $$v_{k,n}(s) = \sqrt{\frac{2}{l_k}}\, w_k(s)\cos\left[\frac{\pi\left(n + \frac{1}{2}\right)}{l_k}(s - c_k)\right], \tag{7}$$

where the frequency index n=0, 1, 2, . . . . It is easy to verify that this construction obeys the condition of locality with p=0 and affine invariance described above. The resulting warped basis (3) on the t-axis can in this case be rewritten in the form $$u_{k,n}(t)=\sqrt{2\phi_k'(t-k)}\,b_k(\phi_k(t-k))\cos\left[\pi(n+\tfrac{1}{2})(\phi_k(t-k)-m_k)\right], \tag{8}$$

for $k\leqq t\leqq k+2$, where $\phi_k$ is defined by gluing together $\psi_k$ and $\psi_{k+1}$ to form a continuously differentiable map of the interval [0,2] onto itself, $$\phi_k(t) = \left\{\begin{array}{ll} 2m_k\psi_k(t), & 0 \le t \le 1; \\ 2(1 - m_k)\psi_{k+1}(t - 1) + 2m_k, & 1 \le t \le 2. \end{array}\right\} \tag{9}$$

This is obtained by putting $$m_k = \frac{1}{2}\phi_k(1) = \frac{\psi'_{k+1}(0)}{\psi'_k(1) + \psi'_{k+1}(0)}. \tag{10}$$

The construction of $\psi_k$ is illustrated in FIG. 1, showing the normalized time on the x-axis and the warped time on the y-axis. FIG. 1 shall be particularly discussed for the case k=0, that is for building $\phi_0(t)$ and therefore deriving a warp function for a first frame 10, lasting from normalized time 0 to normalized time 1 and for a second frame 12 lasting from normalized time 1 to normalized time 2. It is furthermore assumed that first frame 10 has a warp function 14 and second frame 12 has a warp function 16, derived with the aim of achieving equal pitch within the individual frames, when the time axis is trans-formed as indicated by warp functions 14 and 16. It should be noted that warp function 14 corresponds to $\psi_0$ and warp function 16 corresponds to $\psi_1$. According to equation 9, a combined warp function $\phi_0(t)$ 18 is constructed by gluing together the warp maps 14 and 16 to form a continuously differentiable map of the interval [0,2] onto itself. As a result, the point (1,1) is transformed into (1,a), wherein a corresponds to $2m_k$ in equation 9.

As the inventive concept is directed to the application of time warping in an overlap and add scenario, the example of building the next combined warped function for frame 12 and the following frame 20 is also given in FIG. 1. It should be noted that following the overlap and add principle, for full reconstruction of frame 12, knowledge on both warp functions 18 and 22 is required.

It should be further noted that gluing together two independently derived warp functions is not necessarily the only way of deriving a suitable combined warp function $\phi$. (18, 22) as $\phi$ may very well be also derived by directly fitting a suitable warp function to two consecutive frames. It is preferred to have affine consistence of the two warp functions on the overlap of their definition domains.

According to equation 6, the window function in equation 8 is defined by $$b_k(r)0 = \rho\left(\frac{r - m_k}{m_k}\right)\rho\left(\frac{1 + m_k - r}{1 - m_k}\right), \tag{11}$$

which increases from zero to one in the interval $[0,2m_k]$ and decreases from one to zero in the interval $[2m_k,2]$.

A biorthogonal version of (8) can also be derived if there are constants $0<C_1<C_2$, such that $$C_1 \leqq \phi_k'(t) \leqq C_2,\ 0 \leqq t \leqq 2,$$

for al k. Choosing $\eta_k = l_k$ in (4) leads to the specialization of (5) to $$\left\{\begin{array}{l} f_{k,n}(t) = \sqrt{2}\, b_k(\phi_k(t-k))\cos\left[\pi\left(n + \frac{1}{2}\right)(\phi_k(t-k) - m_k)\right]; \\ g_{k,n}(t) = \sqrt{2}\, \phi_k'(t-k) b_k(\phi_k(t-k))\cos\left[\pi\left(n + \frac{1}{2}\right)(\phi_k(t-k) - m_k)\right]. \end{array}\right\} \tag{12}$$

Thus, for the continuous time case, synthesis and analysis functions (equation 12) are derived, being dependent on the combined warped function. This dependency allows for time warping within an overlap and add scenario without loss of information on the original signal, i.e. allowing for a perfect reconstruction of the signal.

It may be noted that for implementation purposes, the operations performed within equation 12 can be decomposed into a sequence of consecutive individual process steps. A particularly attractive way of doing so is to first perform a windowing of the signal, followed by a resampling of the windowed signal and finally by a transformation.

As usually, audio signals are stored and transmitted digitally as discrete sample values sampled with a given sample frequency, the given example for the implementation of the inventive concept shall in the following be further developed for the application in the discrete case.

The time-warped modified discrete cosine transform (TW-MDCT) can be obtained from a time-warped local cosine basis by discretizing analysis integrals and synthesis waveforms. The following description is based on the biorthogonal basis (see equ. 12). The changes required to deal with the orthogonal case (8) consist of an al time domain weighting by the Jacobian factor $\sqrt{\phi_k'(t-k)}$. In the special case where no warp is applied, both constructions reduce to the ordinary MDCT. Let L be the transform size and assume that the signal x(t) to be analyzed is band limited by $q\pi L$ (rad/s) for some $q<1$. This allows the signal to be described by its samples at sampling period 1/L.

The analysis coefficients are given by $$\begin{aligned} c_{k,n} &= \int_k^{k+2} x(t) g_{k,n}(t)\,dt \\ &= \sqrt{2}\int_k^{k+2} x(t) b_k\left(\phi_k(t-k)\right)\cos\left[\pi\left(n + \frac{1}{2}\right)(\phi_k(t-k) - m_k)\right]\phi_k'(t-k)\,dt \end{aligned} \tag{13}$$

Defining the windowed signal portion $x_k(\tau) = x(\tau+k)\, b_k(\phi_k(\tau))$ and performing the substitutions $\tau = t-k$ and $r = \phi_k(\tau)$ in the integral (13) leads to $$c_{k,n} = \int_0^2 x_k(\phi_k^{-1}(r))\cos\left[\pi\left(n + \frac{1}{2}\right)(r - m_k)\right]dr \tag{14}$$

A particularly attractive way of discretizing this integral taught by the current invention is to choose the sample points $r = r_v = m_k + (v + 1/2)/L$, where v in integer valued. Assuming mild warp and the band limitation described above, this gives the approximation $$c_{k,n} \approx \frac{\sqrt{2}}{L}\sum_v X_k(v)\cos\left[\frac{\pi}{L}\left(n + \frac{1}{2}\right)\left(v + \frac{1}{2}\right)\right], \quad n = 0, 1, \ldots, L-1, \tag{15}$$

where $$X_k(v) = x_k(\phi_k^{-1}(r_v)) \tag{16}$$

The summation interval in (15) is defined by $0 \leqq r_v < 2$. It includes $v = 0, 1, \ldots, L-1$ and extends beyond this interval at each end such that the total number of points is 2L. Note that due to the windowing, the result is insensitive to the treatment of the edge cases, which can occur if $m_k = (v_0 + 1/2)/L$ for some integer $v_0$.

As it is well known that the sum (equation 15) can be computed by elementary folding operations followed by a DCT of type IV, it may be appropriate to decompose the operations of equation 15 into a series of subsequent operations and transformations to make use of already existing efficient hardware and software implementations, particularly of DCT (discrete cosine transform). According to the discretized integral, a given discrete time signal can be interpreted as the equidistant samples at sampling periods 1/L of x(t). A first step of windowing would thus lead to:

$$x_k\left(\frac{p + \frac{1}{2}}{L}\right) = x\left(\frac{p + \frac{1}{2}}{L} + k\right) b_k\left(\phi_k\left(\frac{p + \frac{1}{2}}{L}\right)\right) \tag{17}$$

for $p = 0, 1, 2, \ldots, 2L-1$. Prior to the block transformation as described by equation 15 (introducing an additional offset depending on $M_k$), a resampling is required, mapping $$x_k\left(\frac{p+\frac{1}{2}}{L}\right) \mapsto x_k\left(\phi_k^{-1}\left(m_k + \frac{v+\frac{1}{2}}{L}\right)\right). \quad (18)$$

The resampling operation can be performed by any suitable method for non-equidistant resampling.

Summarizing, the inventive time-warped MDCD can be decomposed into a windowing operation, a resampling and a block-transform.

Figure 2:
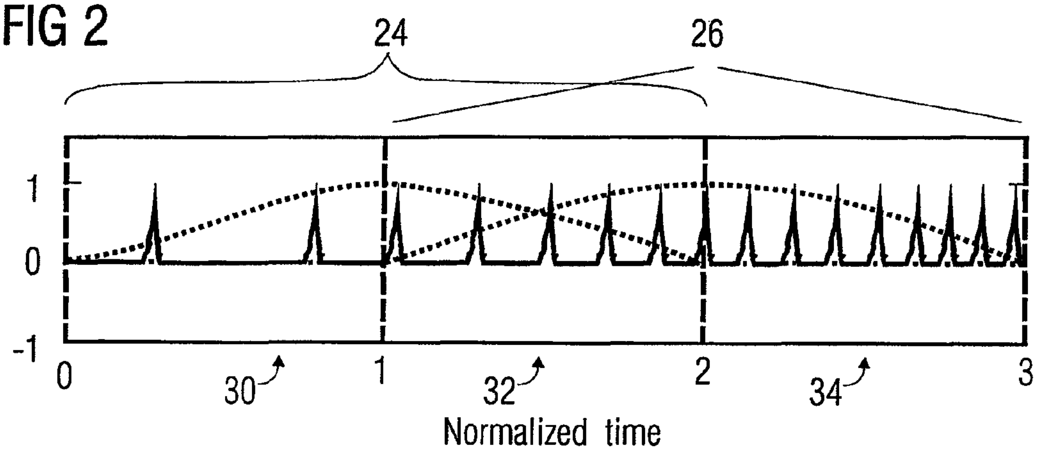
FIGS. 2-2*b* show the application of an inventive warp-dependent window.

The individual steps shall in the following be shortly described referencing FIGS. 2 to 3*b*. FIGS. 2 to 3*b* show the steps of time warped MDCT encoding considering only two windowed signal blocks of a synthetically generated pitched signal. Each individual frame comprises 1024 samples such that each of two considered combined frames 24 and 26 (original frames 30 and 32 and original frames 32 and 34) consists of 2048 samples such that the two windowed combined frames have an overlap of 1024 samples. FIGS. 2 to 2*b* show at the x-axis the normalized time of 3 frames to be processed. First frame 30 ranges from 0 to 1, second frame 32 ranges from 1 to 2, and 3 frame ranges from 2 to 3 on the time axis. Thus, in the normalized time domain, each time unit corresponds to one complete frame having 1024 signal samples. The normalized analysis windows span the normalized time intervals [0,2] and [1,3]. The aim of the following considerations is to recover the middle frame 32 of the signal. As the reconstruction of the outer signal frames (30, 34) requires data from adjacent windowed signal segments, this reconstruction is not to be considered here. It may be noted that the combined warp maps shown in FIG. 1 are warp maps derived from the signal of FIG. 2, illustrating the inventive combination of three subsequent normalized warp maps (dotted curves) into two overlapping warp maps (solid curves). As explained above, inventive combined warp maps 18 and 22 are derived for the signal analysis. Furthermore, it may be noted that due to the affine invariance of warping, this curve represents a warped map with the same warp as in the original two segments.

FIG. 2 illustrates the original signal by a solid graph. Its stylized pulse-train has a pitch that grows linearly with time, hence, it has positive and decreasing warp considering that warp is defined to be the logarithmic derivative of the pitch. In FIG. 2, the inventive analysis windows as derived using equation 17 are superimposed as dotted curves. It should be noted that the deviation from standard symmetric windows (as for example in MDCT) is largest where the warp is largest that is, in the first segment [0,1]. The mathematical definition of the windows alone is given by resampling the windows of equation 11, resampling implemented as expressed by the second factor of the right hand side of equation 17.

Figure 2A:
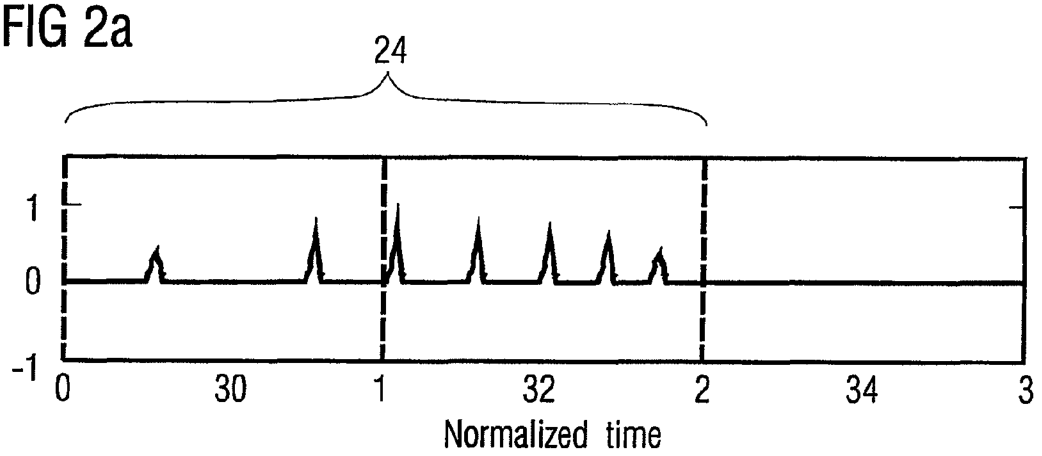
Figure 2B:
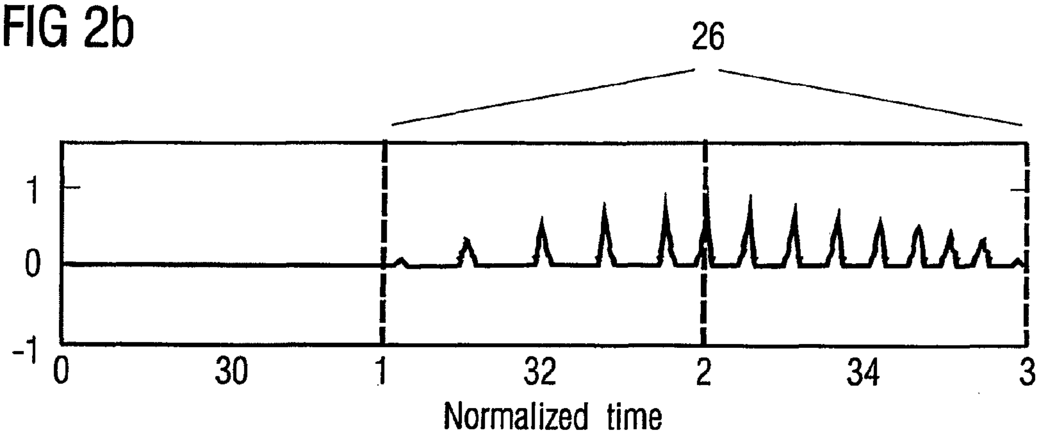

FIGS. 2*a* and 2*b* illustrate the result of the inventive windowing, applying the windows of FIG. 2 to the individual signal segments.

Figure 3A:
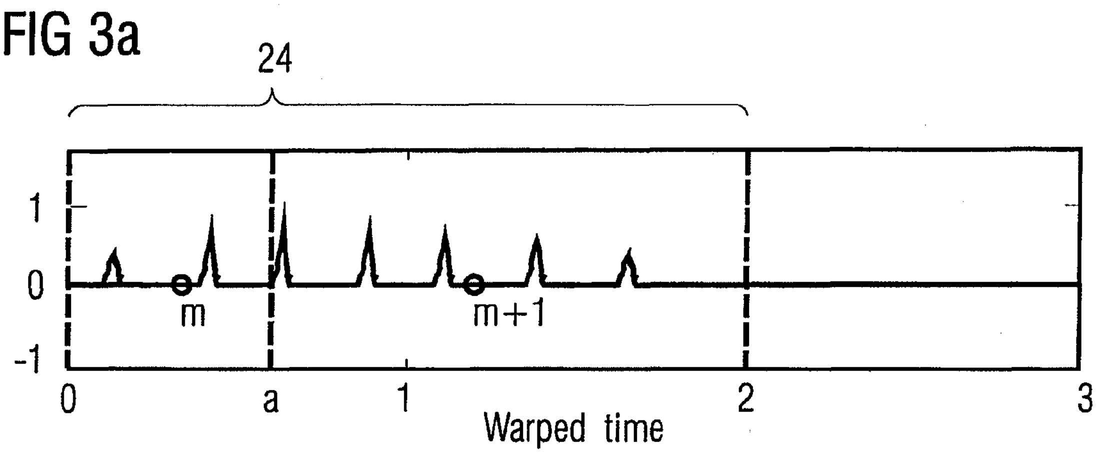
FIGS. 3*a*, 3*b* show an example for inventive resampling.
Figure 3B:
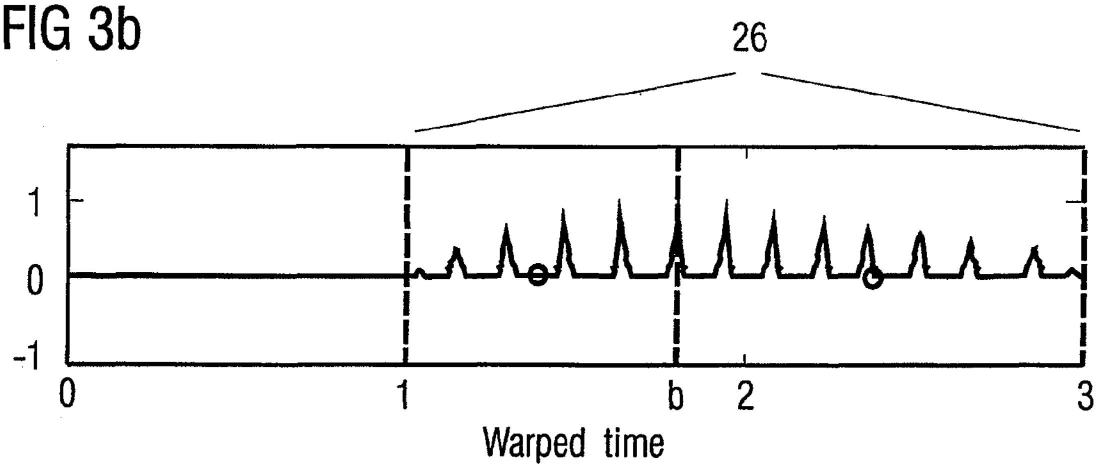

FIGS. 3*a* and 3*b* illustrate the result of the warp parameter dependent resampling of the windowed signal blocks of FIGS. 2*a* and 2*b*, the resampling performed as indicated by the warp maps given by the solid curves of FIG. 1. Normalized time interval [0,1] is mapped to the warped time interval [0,a], being equivalent to a compression of the left half of the windowed signal block. Consequently, an expansion of the right half of the windowed signal block is performed, mapping the internal [1,2] to [a,2]. Since the warp map is derived from the signal with the aim of deriving the warped signal with constant pitch, the result of the warping (resampling according to equation 18) is a windowed signal block having constant pitch. It should be noted that a mismatch between the warped map and the signal would lead to a signal block with still varying pitch at this point, which would not disturb the final reconstruction.

The off-set of the following block transform is marked by circles such that the interval [m, m+1] corresponds to the discrete samples v=1, 0, . . . L−1 with L=1024 in formula 15. This does equivalently mean that the modulating wave forms of the block transform share a point of even symmetry at m and a point of odd symmetry at m+1. It is furthermore important to note that a equals 2m such that m is the mid point between 0 and a and m+1 is the mid point between a and 2. Summarizing, FIGS. 3*a* and 3*b* describe the situation after the inventive resampling described by equation 18 which is, of course, depending on the warp parameters.

The time-warped transform domain samples of the signals of FIGS. 3*a* and 3*b* are then quantized and coded and may be transmitted together with warp side information describing normalized warp maps $\psi_k$ to a decoder. As quantization is a commonly known technique, quantization using a specific quantization rule is not illustrated in the following figures, focusing on the reconstruction of the signal on the decoder side.

In one embodiment of the present invention, the decoder receives the warp map sequence together with decoded time-warped transform domain samples $d_{k,n}$, where $d_{k,n}=0$ for $n \geqq L$ can be assumed due to the assumed band limitation of the signal. As on the encoder side, the starting point for achieving discrete time synthesis shall be to consider continuous time reconstruction using the synthesis wave-forms of equation 12:

$$y(t) = \sum_{n,k} d_{n,k} f_{n,k}(t) = \sum_k y_k(t-k) \quad (19)$$

where $$y_k(u) = z_k(\phi_k(u)) \quad (20)$$

and with $$z_k(r) = \sqrt{2}\, b_k(r) \sum_{n=0}^{L-1} d_{k,n} \cos\left[\pi\left(n+\frac{1}{2}\right)(r-m_k)\right]. \quad (21)$$

Equation (19) is the usual overlap and ad procedure of a windowed transform synthesis. As in the analysis stage, it is advantageous to sample equ. (21) at the points $r=r_v=m_k+(v+½)/L$, giving rise to $$z_k(r_v) = \sqrt{2}\, b_k(r_v) \sum_{n=0}^{L-1} d_{k,n} \cos\left[\frac{\pi}{L}\left(n+\frac{1}{2}\right)\left(v+\frac{1}{2}\right)\right] \quad (22)$$

which is easily computed by the following steps: First, a DCT of type IV followed by extension in 2L into samples depending on the offset parameter $m_k$ according to the rule $0 \leqq r_v < 2$. Next, a windowing with the window $b_k(r_v)$ is performed. Once $z_k(r_v)$ is found, the resampling $$z_k\left(m_k + \frac{v+\frac{1}{2}}{L}\right) \mapsto z_k\left(\phi_k\left(\frac{p+\frac{1}{2}}{L}\right)\right) \quad (23)$$

gives the signal segment $y_k$ at equidistant sample points $$\left(p+\frac{1}{2}\right)/L$$

ready for the overlap and add operation described in formula (19).

The resampling method can again be chosen quite freely and does not have to be the same as in the encoder. In one embodiment of the present invention spline interpolation based methods are used, where the order of the spline functions can be adjusted as a function of a band limitation parameter q so as to achieve a compromise between the computational complexity and the quality of reconstruction. A common value of parameter q is q=⅓, a case in which quadratic splines will often suffice.

Figure 4A:
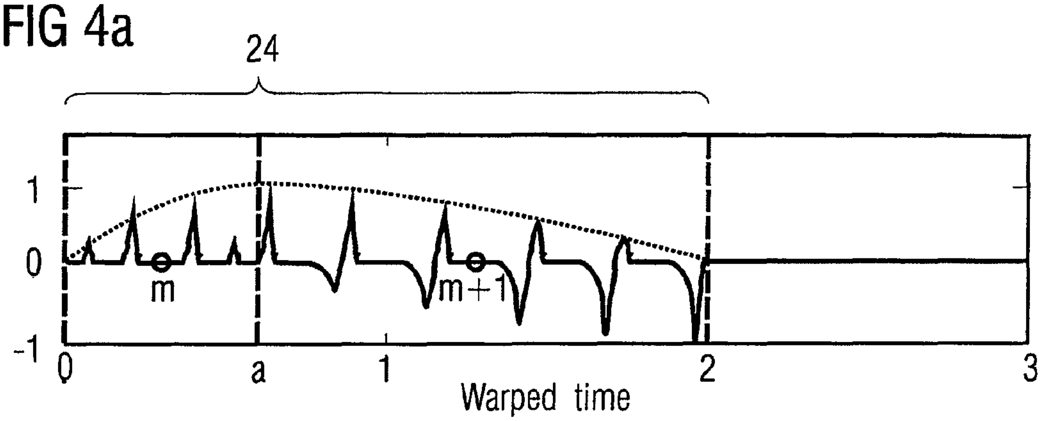
FIGS. 4*a*, 4*b* show an example for inventive signal synthesis on the decoder side.
Figure 4B:
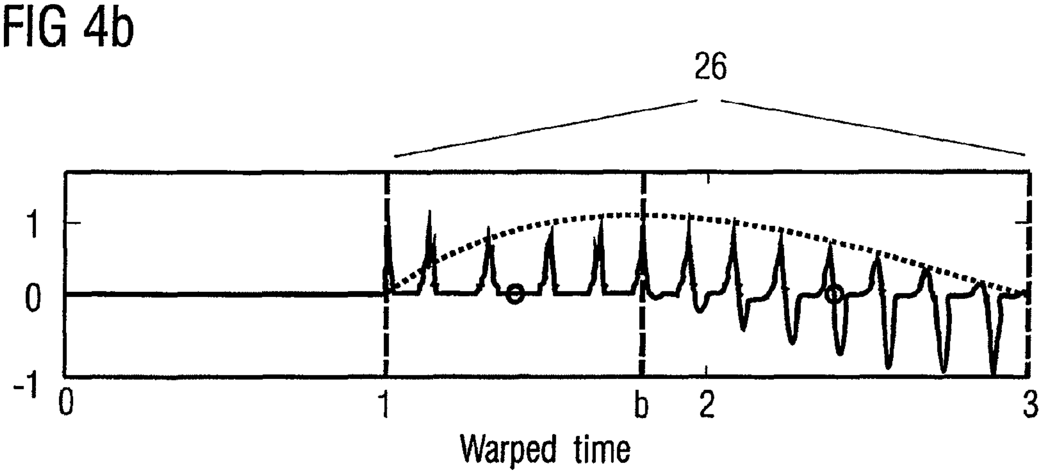

The decoding shall in the following be illustrated by FIGS. 4*a* to 7 for the signal shown in FIGS. 3*a* and 3*b*. It shall again be emphasized that the block transform and the transmission of the transform parameters is not described here, as this is a technique commonly known. As a start for the decoding process, FIGS. 4*a* and 4*b* show a configuration, where the reverse block transform has already been performed, resulting in the signals shown in FIGS. 4*a* and 4*b*. One important feature of the inverse block transform is the addition of signal components not present in the original signal of FIGS. 3*a* and 3*b*, which is due to the symmetry properties of the synthesis functions already explained above. In particular, the synthesis function has even symmetry with respect to m and odd symmetry with respect to m+1. Therefore, in the interval [0,a], positive signal components are added in the reverse block transform whereas in the interval [a,2], negative signal components are added. Additionally, the inventive window function used for the synthesis windowing operation is superimposed as a dotted curve in FIGS. 4*a* and 4*b*.

Figure 5A:
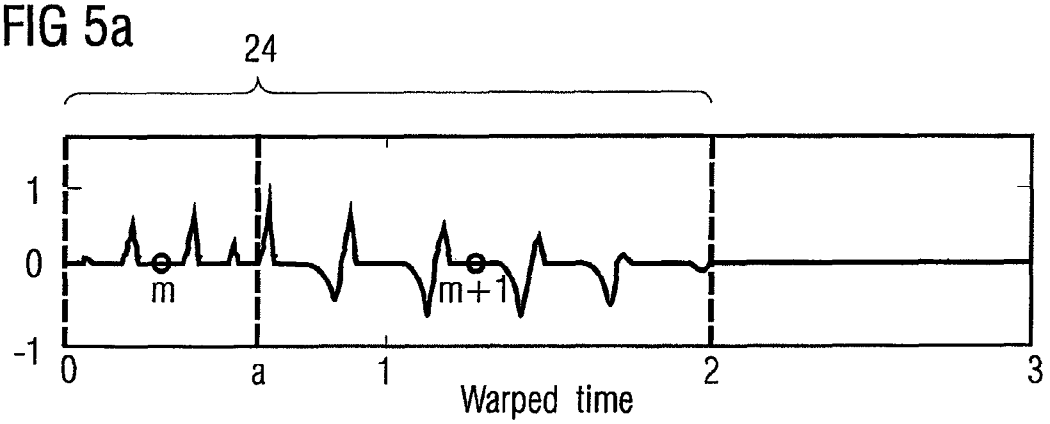
FIGS. 5*a*, 5*b* show an example for inventive windowing on the decoder side.
Figure 5B:
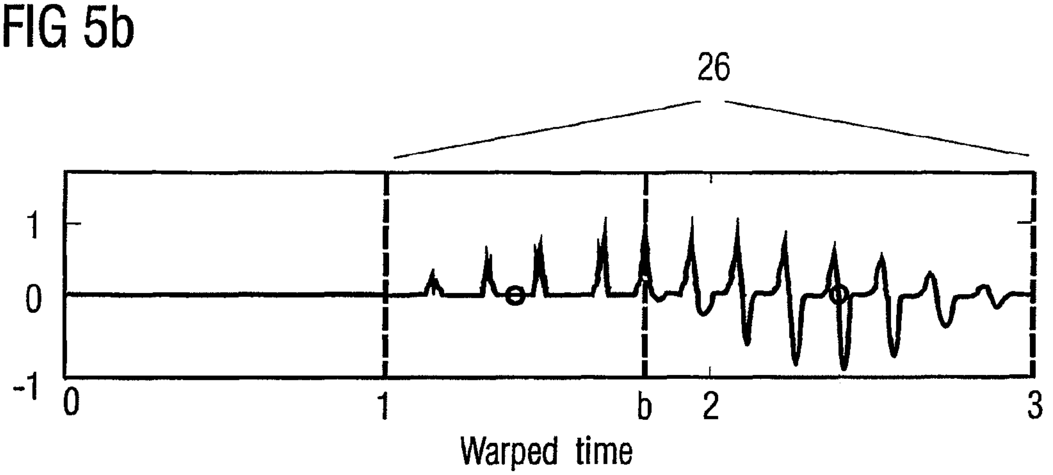

The mathematical definition of this synthesis window in the warped time domain is given by equation 11. FIGS. 5*a* and 5*b* show the signal, still in the warped time domain, after application of the inventive windowing.

Figure 6A:
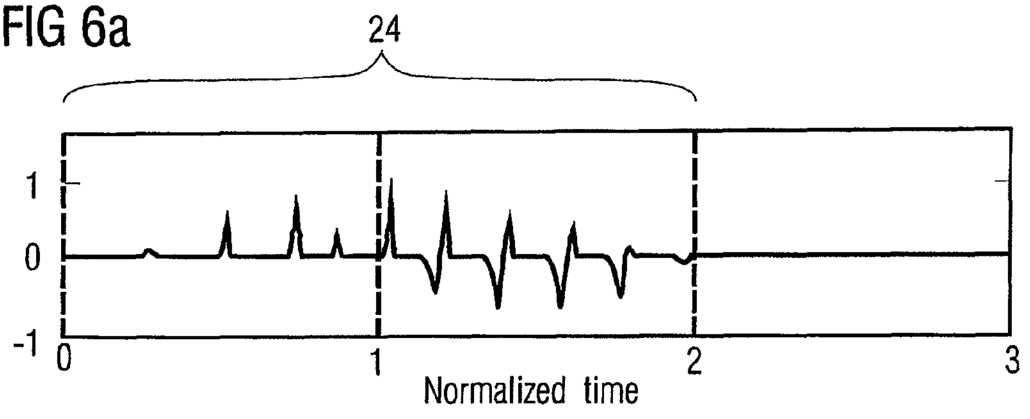
FIGS. 6*a*, 6*b* show an example for inventive time warping on the decoder side.
Figure 6B:
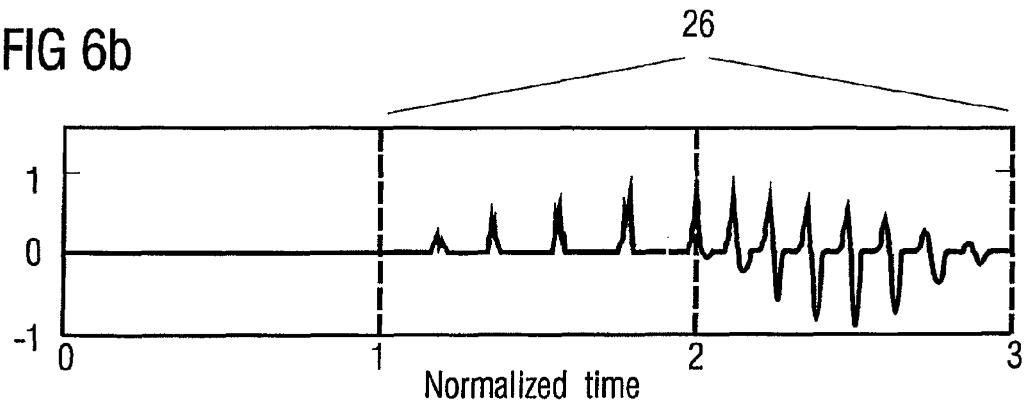

FIGS. 6*a* and 6*b* finally show the result of the warp parameter-dependent resampling of the signals of FIGS. 5*a* and 5*b*.

Figure 7:
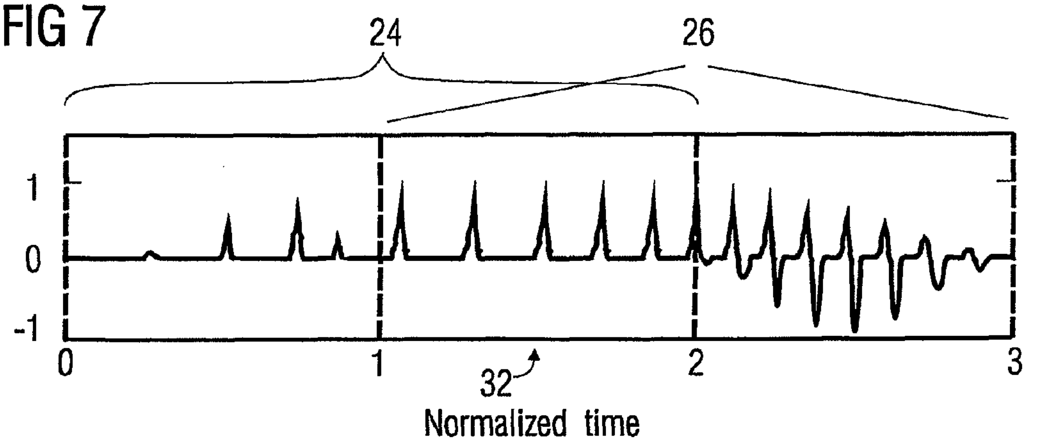
FIG. 7 shows an example for an inventive overlap and add procedure on the decoder side.

Finally, FIG. 7 shows the result of the overlap-and-add operation, being the final step in the synthesis of the signal. (see equation 19). The overlap-and-add operation is a superposition of the waveforms of FIGS. 6*a* and 6*b*. As already mentioned above, the only frame to be fully reconstructed is the middle frame 32, and, a comparison with the original situation of FIG. 2 shows that the middle frame 32 is reconstructed with high fidelity. The precise cancellation of the disturbing addition signal components introduced during the inverse block transform is only possible since it is a crucial property of the present invention that the two combined warped maps 14 and 22 in FIG. 1 differ only by an affine map within the overlapping normalized time interval [1,2]. A consequence of this is that there is a correspondence between signal portions and windows on the warped time segments [a,2] and [1,b]. When considering FIGS. 4*a* and 4*b*, a linear stretching of segments [1,b] into [a,2] will therefore make the signal graphs and window halves describe the well known principle of time domain aliasing cancellation of standard MDCT. The signal, already being alias-cancelled, can then simply be mapped onto the normalized time interval [1,2] by a common inverse warp map.

It may be noted that, according to a further embodiment of the present invention, additional reduction of computational complexity can be achieved by application of a pre-filtering step in the frequency domain. This can be implemented by simple pre-weighting of the transmitted sample values dkn. Such a pre-filtering is for example described in M. Unser, A. Aldroubi, and M. Eden, "B-spline signal processing part II-efficient design and applications". A implementation requires B-spline resampling to be applied to the output of the inverse block transform prior to the windowing operation. Within this embodiment, the resampling operates on a signal as derived by equation 22 having modified $d_{k,n}$. The application of the window function $b_k(r_v)$ is also not performed. Therefore, at each end of the signal segment, the resampling must take care of the edge conditions in terms of periodicities and symmetries induced by the choice of the block transform. The required windowing is then performed after the resampling using the window $$b_k\left(\phi_k\left(\left(p+\frac{1}{2}\right)/L\right)\right).$$

Summarizing, according to a first embodiment of an inventive decoder, inverse time-warped MDCT comprises, when decomposed into individual steps:

Inverse transform
Windowing
Resampling
Overlap and add.

According to a second embodiment of the present invention inverse time-warped MDCT comprises:

Spectral weighting
inverse transform
Resampling
Windowing
Overlap and add.

It may be noted that in a case when no warp is applied, that is the case where all normalized warp maps are trivial, ($\psi_k(t)=t$), the embodiment of the present invention as detailed above coincides exactly with usual MDCT.

Further embodiments of the present invention incorporating the above-mentioned features shall now be described referencing FIGS. 8 to 15.

Figure 8:
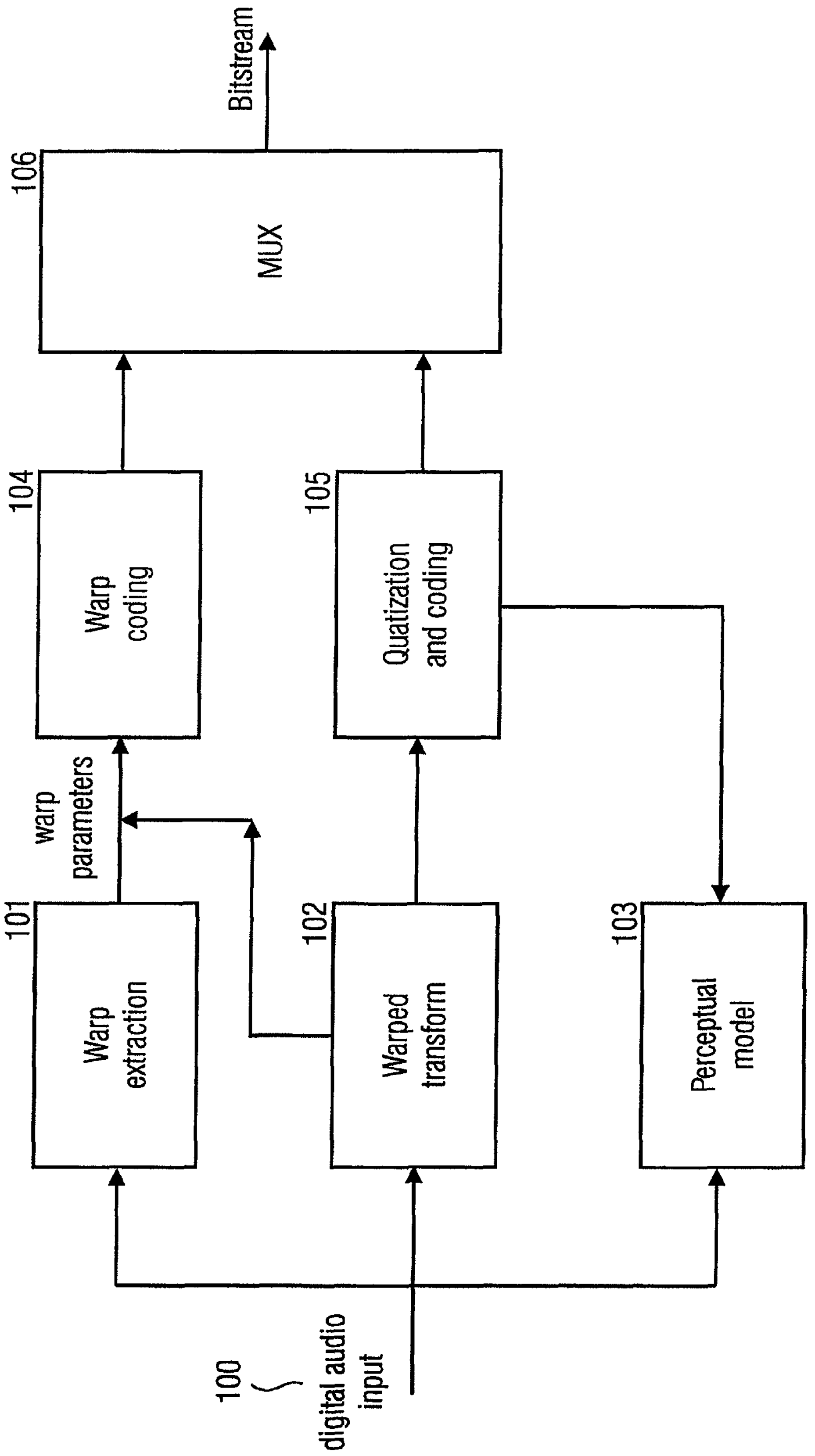
FIG. 8 shows an example of an inventive audio encoder.

FIG. 8 shows an example of an inventive audio encoder receiving a digital audio signal 100 as input and generating a bit stream to be transmitted to a decoder incorporating the inventive time-warped transform coding concept. The digital audio input signal 100 can either be a natural audio signal or a preprocessed audio signal, where for instance the preprocessing could be a whitening operation to whiten the spectrum of the input signal. The inventive encoder incorporates a warp parameter extractor 101, a warp transformer 102, a perceptual model calculator 103, a warp coder 104, an encoder 105, and a multiplexer 106. The warp parameter extractor 101 estimates a warp parameter sequence, which is input into the warp transformer 102 and into the warp coder 104. The warp transformer 102 derives a time warped spectral representation of the digital audio input signal 100. The time-warped spectral representation is input into the encoder 105 for quantization and possible other coding, as for example differential coding. The encoder 105 is additionally controlled by the perceptual model calculator 103. Such, for example, the coarseness of quantization may be increased when signal components are to be encoded that are mainly masked by other signal components. The warp coder 104 encodes the warp parameter sequence to reduce its size during transmission within the bit stream. This could for example comprise quantization of the parameters or, for example, differential encoding or entropy-coding techniques as well as arithmetic coding schemes.

The multiplexer 106 receives the encoded warp parameter sequence from the warp coder 104 and an encoded time-warped spectral representation of the digital audio input signal 100 to multiplex both data into the bit stream output by the encoder.

Figure 9:
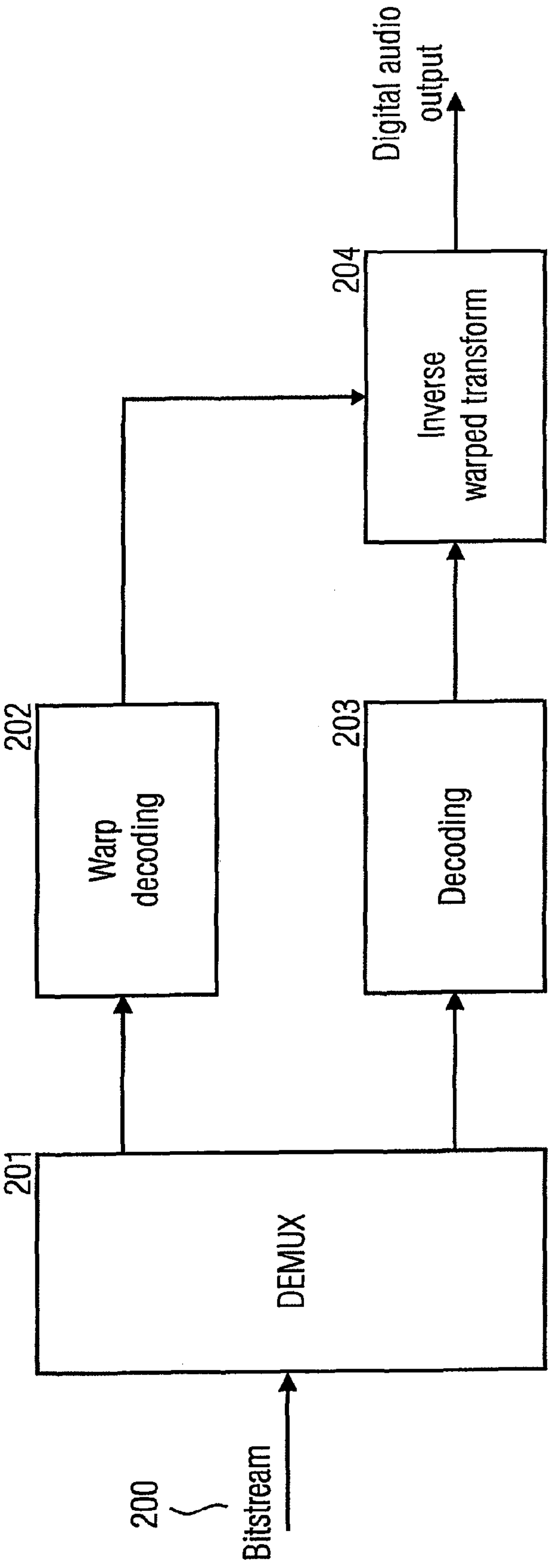
FIG. 9 shows an example of an inventive audio decoder.

FIG. 9 illustrates an example of a time-warped transform decoder receiving a compatible bit stream 200 for deriving a reconstructed audio signal as output. The decoder comprises a de-multiplexer 201, a warp decoder 202, a decoder 203, and an inverse warp transformer 204. The de-multiplexer de-multiplexes the bit stream into the encoded warp parameter sequence, which is input into the warp decoder 202. The de-multiplexer further de-multiplexes the encoded representation of the time-warped spectral representation of the audio signal, which is input into the decoder 203 being the inverse of the corresponding encoder 105 of the audio encoder of FIG. 8. Warp decoder 202 derives a reconstruction of the warp parameter sequence and decoder 203 derives a time-warped spectral representation of the original audio signal. The representation of the warp parameter sequence as well as the time-warped spectral representation are input into the inverse warp transformer 204 that derives a digital audio output signal implementing the inventive concept of time-warped overlapped transform coding of audio signals.

Figure 10:
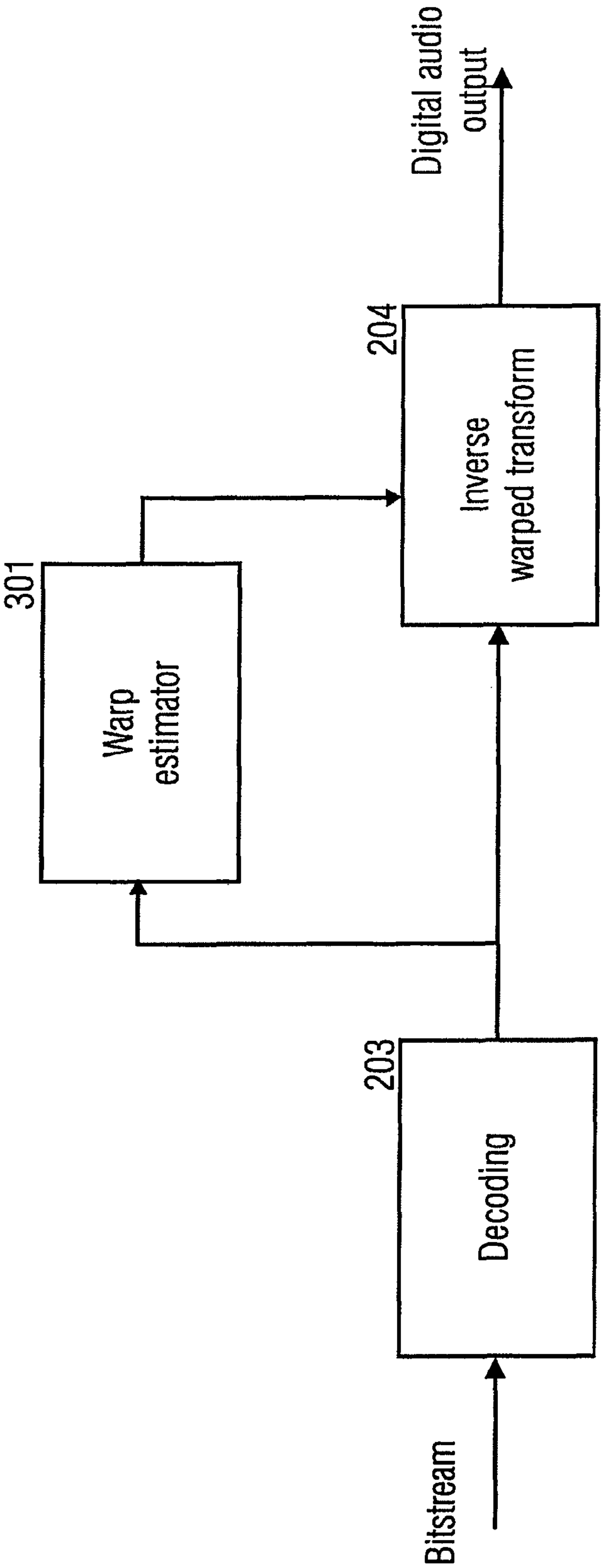
FIG. 10 shows a further example of an inventive decoder.

FIG. 10 shows a further embodiment of a time-warped transform decoder in which the warp parameter sequence is derived in the decoder itself. The alternative embodiment shown in FIG. 10 comprises a decoder 203, a warp estimator 301, and an inverse warp transformer 204. The decoder 203 and the inverse warp transformer 204 share the same functionalities as the corresponding devices of the previous embodiment and therefore the description of these devices within different embodiments is fully interchangeable. Warp estimator 301 derives the actual warp of the time-warped spectral representation output by decoder 203 by combining earlier frequency domain pitch estimates with a current frequency domain pitch estimate. Thus, the warp parameters sequence is signalled implicitly, which has the great advantage that further bit rate can be saved since no additional warp parameter information has to be transmitted in the bit stream input into the decoder. However, the implicit signalling of warped data is limited by the time resolution of the transform.

Figure 11:
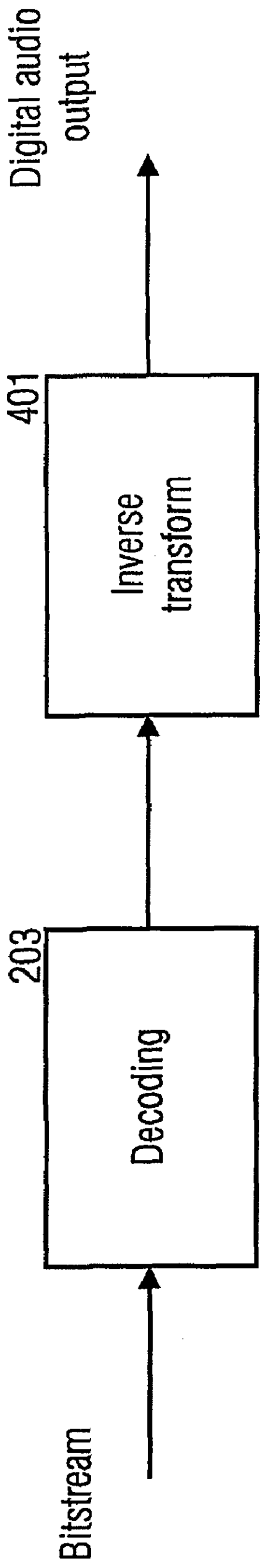
FIG. 11 shows an example for a backward-compatible implementation of the inventive concepts.

FIG. 11 illustrates the backwards compatibility of the inventive concept, when prior art decoders not capable of the inventive concept of time-warped decoding are used. Such a decoder would neglect the additional warp parameter information, thus decoding the bit stream into a frequency domain signal fed into an inverse transformer 401 not implementing any warping. Since the frequency analysis performed by time-warped transformation in inventive encoders is well aligned with the transform that does not include any time warping, a decoder ignoring warp data will still produce a meaningful audio output. This is done at the cost of degraded audio quality due to the time warping, which is not reversed within prior art decoders.

Figure 12:
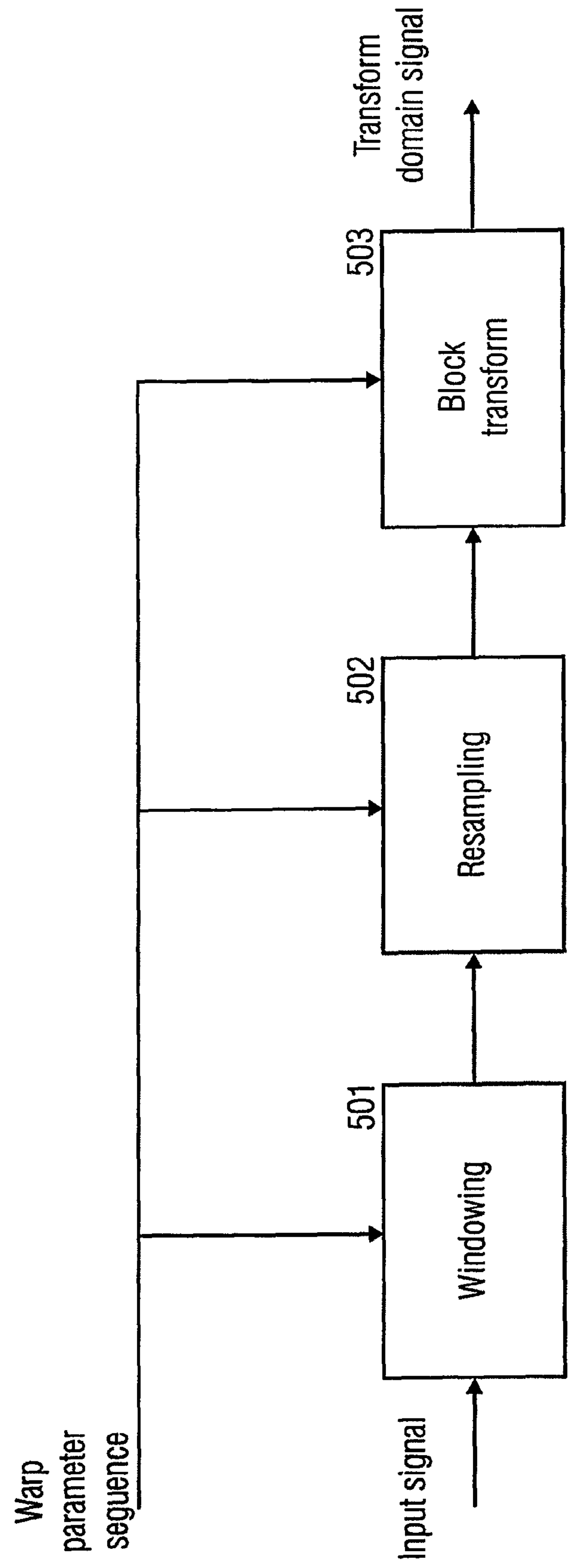
FIG. 12 shows a block diagram for an implementation of the inventive encoding.

FIG. 12 shows a block diagram of the inventive method of time-warped transformation. The inventive time-warp transforming comprises windowing 501, resampling 502, and a block transformation 503. First, the input signal is windowed with an overlapping window sequence depending on the warp parameter sequence serving as additional input to each of the individual encoding steps 501 to 503. Each windowed input signal segment is subsequently resampled in the resampling step 502, wherein the resampling is performed as indicated by the warp parameter sequence.

Within the block transformation step 503, a block transform is derived typically using a well-known discrete trigonometric transform. The transform is thus performed on the windowed and resampled signal segment. It is to be noted that the block transform does also depend on an offset value, which is derived from the warp parameter sequence. Thus, the output consists of a sequence of transform domain frames.

Figure 13:
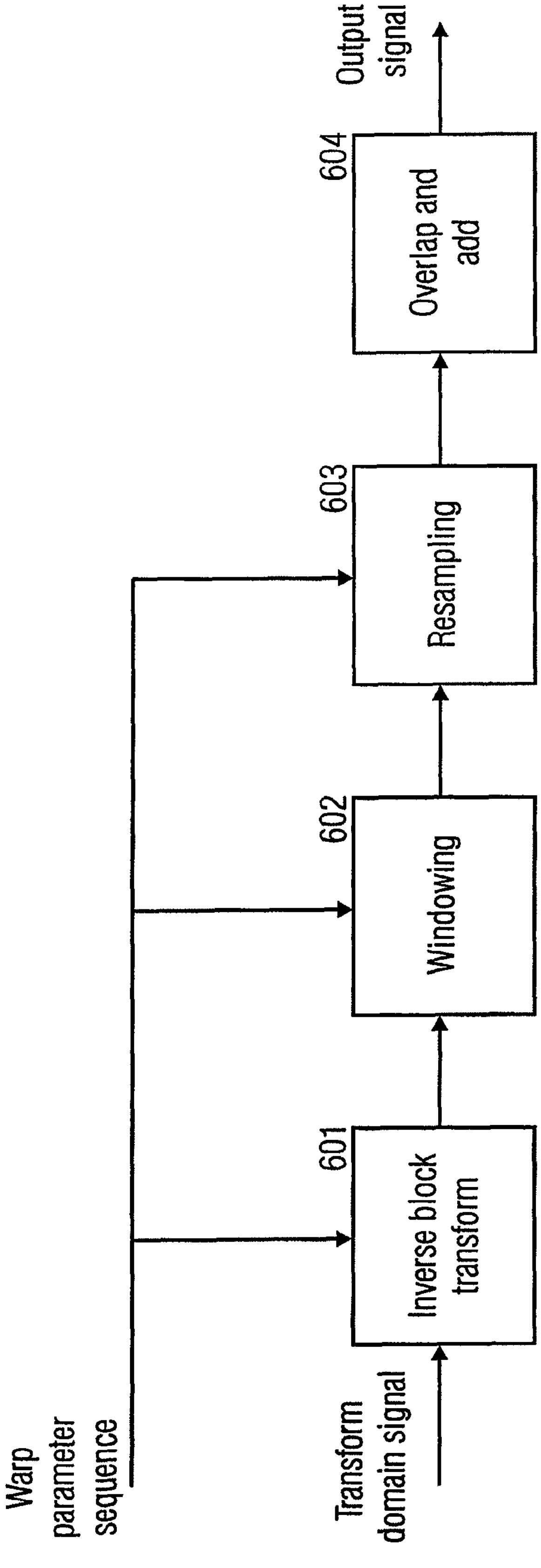
FIG. 13 shows a block diagram for an example of inventive decoding.

FIG. 13 shows a flow chart of an inverse time-warped transform method. The method comprises the steps of inverse block transformation 601, windowing 602, resampling 603, and overlapping and adding 604. Each frame of a transform domain signal is converted into a time domain signal by the inverse block transformation 601. Corresponding to the encoding step, the block transform depends on an offset value derived from the received parameter sequence serving as additional input to the inverse block transforming 601, the windowing 602, and the resampling 603. The signal segment derived by the block transform 601 is subsequently windowed in the windowing step 602 and resampled in the resampling 603 using the warped parameter sequence. Finally, in overlapping and adding 604, the windowed and resampled segment is added to the previously inversely transformed segments in an usual overlap and add operation, resulting in a reconstruction of the time domain output signal.

Figure 14:
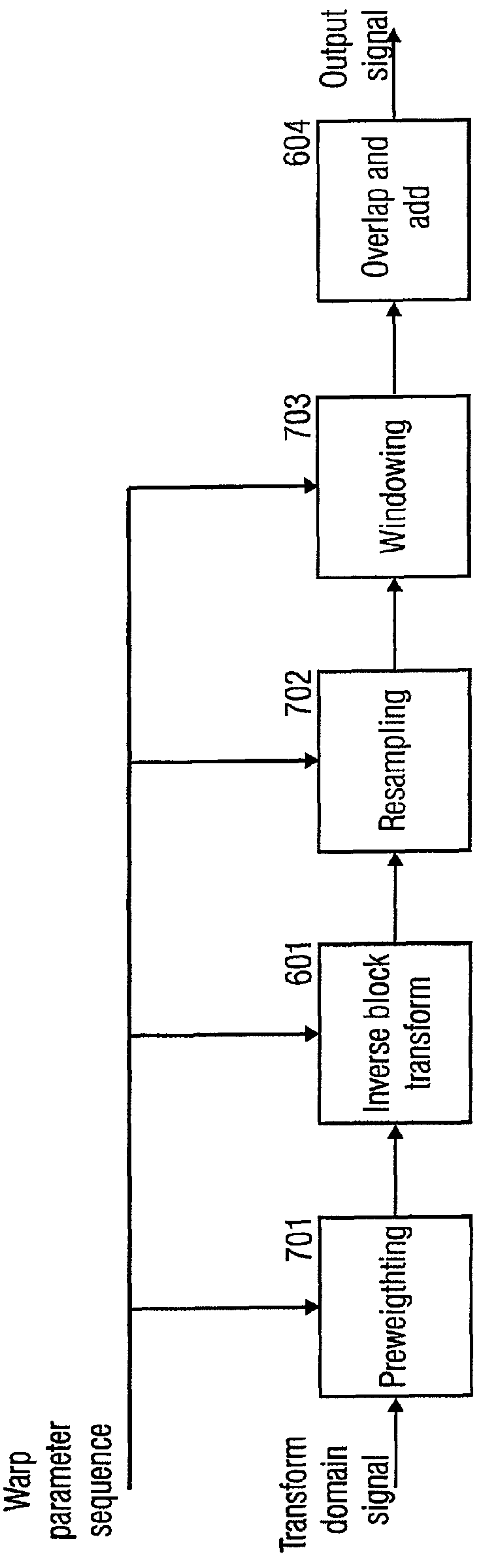
FIG. 14 shows a block diagram of a further embodiment of inventive decoding.

FIG. 14 shows an alternative embodiment of an inventive inverse time-warp transformer, which is implemented to additionally reduce the computational complexity. The decoder partly shares the same functionalities with the decoder of FIG. 13. Therefore the description of the same functional blocks in both embodiments are fully interchangeable. The alternative embodiment differs from the embodiment of FIG. 13 in that it implements a spectral pre-weighting 701 before the inverse block transformation 601. This fixed spectral pre-weighting is equivalent to a time domain filtering with periodicities and symmetries induced by the choice of the block transform. Such a filtering operation is part of certain spline based re-sampling methods, allowing for a reduction of the computational complexity of subsequent modified resampling 702. Such resampling is now to be performed in a signal domain with periodicities and symmetries induced by the choice of the block transform. Therefore, a modified windowing step 703 is performed after resampling 702. Finally, in overlapping and adding 604 the windowed and resampled segment is added to the previously inverse-transformed segment in an usual overlap and add procedure giving the reconstructed time domain output signal.

Figure 15A:
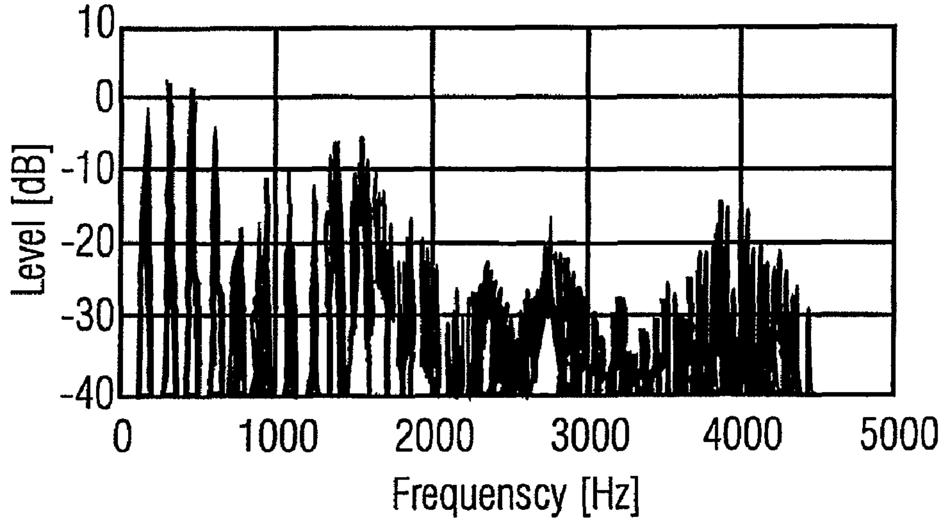
FIGS. 15*a*,15*b* show an illustration of achievable coding efficiency implementing the inventive concept.
Figure 15B:
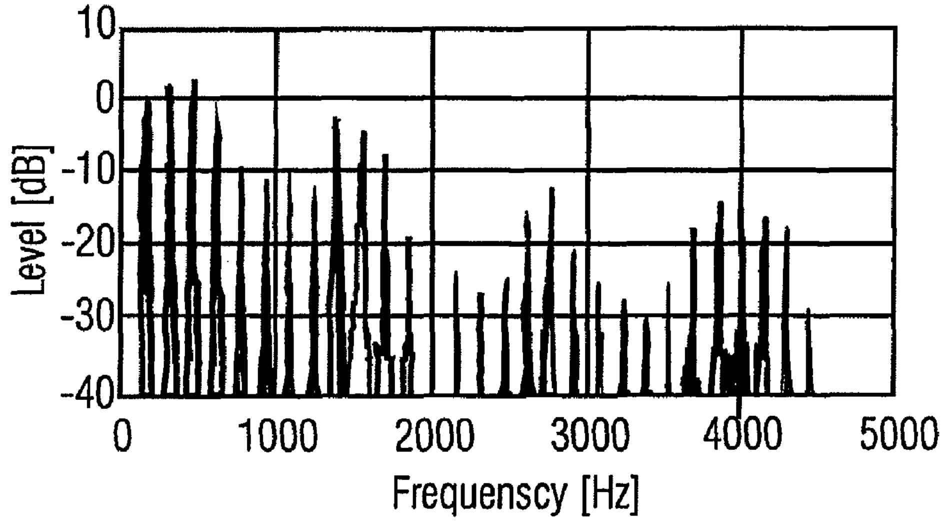

FIGS. 15*a* and 15*b* show the strength of the inventive concept of time-warped coding, showing spectral representations of the same signal with and without time warping applied. FIG. 15*a* illustrates a frame of spectral lines originating from a modified discrete cosine transform of transform size 1024 of a male speech signal segment sampled at 16 kHz. The resulting frequency resolution is 7.8 Hz and only the first 600 lines are plotted for this illustration, corresponding a bandwidth of 4.7 kHz. As can be seen from the fundamental frequency and the plot, the segment is a voiced sound with a mean pitch of approximately, 155 Hz. As can be furthermore seen from FIG. 15*a*, the few first harmonics of the pitch-frequency are clearly distinguishable, but towards high frequencies, the analysis becomes increasingly dense and scrambled. This is due to the variation of the pitch within the length of the signal segment to be analyzed. Therefore, the coding of the mid to high frequency ranges requires a substantial amount of bits in order to not introduce audible artefacts upon decoding. Conversely, when fixing the bit rate, substantial amount of distortion will inevitably result from the demand of increasing the coarseness of quantization.

FIG. 15*b* illustrates a frame of spectral lines originating from a time-warped modified discrete cosine transform according to the present invention. Obviously, the same original male audio signal has been used as in FIG. 15*a*. The transform parameters are the same as for FIG. 15*a*, but the use of a time-warped transform adapted to the signal has the visible dramatic effect on the spectral representation. The sparse and organized character of the signal in the time-warped transform domain yields a coding with much better rate distortion performance, even when the cost of coding the additional warp data is taken into account.

As already mentioned, transmission of warp parameters instead of transmission of pitch or speed information has the great advantage of decreasing the additional required bit rate dramatically. Therefore, in the following paragraphs, several inventive schemes of transmitting the required warp parameter information are detailed.

For a signal with warp a(t) at time t, the optimal choice of normalized warp map sequence $\psi_k$ for the local cosine bases (see (8), (12) is obtained by solving $$\frac{\psi_k''(t-k)}{\psi_k'(t-k)} = a(t), \quad k \le t \le k+1 \tag{24}$$

However, the amount of information required to describe this warp map sequence is too large and the definition and measurement of pointwise values of a(t) is difficult. For practical purposes, a warp update interval Δt is decided upon and each warp map $\psi_k$ is described by $N=1/\Delta t$ parameters. A Warp update interval of around 10-20 ms is typically sufficient for speech signals. Similarly to the construction in (9) of $\phi_k$ from $\psi_k$ and $\psi_{k+1}$, a continuously differentiable normalized warp map can be pieced together by N normalized warp maps via suitable affine re-scaling operations. Prototype examples of normalized warp maps include $$\left\{\begin{array}{l} \text{Quadratic: } t \mapsto \left(1-\frac{a}{2}\right)t + \frac{a}{2}t^2; \\ \text{Exponential: } t \mapsto \frac{\exp(at)-1}{\exp(a)-1}; \\ \textit{Möbius: } t \mapsto \frac{t}{\alpha+(1-\alpha)t}, \quad \alpha = \frac{4+a}{4-a}, \end{array}\right\} \tag{25}$$

where a is a warp parameter. Defining the warp of a map h(t) by h"/h', all three maps achieve warp equal to a at t=½. The exponential map has constant warp in the whole interval $0 \leqq t \leqq 1$, and for small values of a, the other two maps exhibit very small deviation from this constant value. For a given warp map applied in the decoder for the resampling (23), its inverse required in the encoder for the resampling (equ. 18). A principal part of the effort for inversion originates from the inversion of the normalized warp maps. The inversion of a quadratic map requires square root operations, the inversion of an exponential map requires a logarithm, and the inverse of the rational Moebius map is a Moebius map with negated warp parameter. Since exponential functions and divisions are comparably expensive, a focus on maximum ease of computation in the decoder leads to the preferred choice of a piecewise quadratic warp map sequence $\psi_k$.

The normalized warp map $\psi_k$ is then fully defined by N warp parameters $a_k(0)$, $a_k(1)$, . . . , $a_k(N-1)$ by the requirements that it is a normalized warp map;

is pieced together by rescaled copies of one of the smooth prototype warp maps (25);

is continuously differentiable;

satisfies $$\frac{\psi_k''\left(\frac{l+\frac{1}{2}}{N}\right)}{\psi_k'\left(\frac{l+\frac{1}{2}}{N}\right)} = a_k(l), \quad l = 0, 1, \ldots, N-1 \tag{26}$$

The present invention teaches that the warp parameters can be linearly quantized, typically to a step size of around 0.5 Hz. The resulting integer values are then coded. Alternatively, the derivative $\psi_k'$ can be interpreted as a normalized pitch curve where the values $$\frac{\psi_k'(l\Delta t)}{\psi_k'(0)} - 1, \quad l = 1, 2, \ldots, N, \tag{27}$$

are quantized to a fixed step size, typically 0.005. In this case the resulting integer values are further difference coded, sequentially or in a hierarchical manner. In both cases, the resulting side information bitrate is typically a few hundred bits per second which is only a fraction of the rate required to describe pitch data in a speech codec.

An encoder with large computational resources can determine the warp data sequence that optimally reduces the coding cost or maximizes a measure of sparsity of spectral lines. A less expensive procedure is to use well known methods for pitch tracking resulting in a measured pitch function p(t) and approximating the pitch curve with a piecewise linear function $p_0(t)$ in those intervals where the pitch track exist and does not exhibit large jumps in the pitch values. The estimated warp sequence is then given by $$a_k(l) = \frac{2}{\Delta t}\,\frac{p_0((l+1)\Delta t + k) - p_0(l\Delta t + k)}{p_0((l+1)\Delta t + k) + p_0(l\Delta t + k)} \tag{28}$$

inside the pitch tracking intervals. Outside those intervals the warp is set to zero. Note that a systematic error in the pitch estimates such as pitch period doubling has very little effect on warp estimates.

As illustrated in FIG. 10, in an alternative embodiment of the present invention, the warped parameter sequence may be derived from the decoded transform domain data by a warp estimator. The principle is to compute a frequency domain pitch estimate for each frame of transform data or from pitches of subsequent decoded signal blocks. The warp information is then derived from a formula similar to formula 28.

The application of the inventive concept has mainly been described by applying the inventive time warping in a single audio channel scenario. The inventive concept is of course by no way limited to the use within such a monophonic scenario. It may be furthermore extremely advantageous to use the high coding gain achievable by the inventive concept within multichannel coding applications, where the single or the multiple channel has to be trans-mitted may be coded using the inventive concept.

Furthermore, warping could generally be defined as a trans-formation of the x-axis of an arbitrary function depending on x. Therefore, the inventive concept may also be applied to scenarios where functions or representation of signals are warped that do not explicitly depend on time. For example, warping of a frequency representation of a signal may also be implemented.

Furthermore, the inventive concept can also be advantageously applied to signals that are segmented with arbitrary segment length and not with equal length as described in the preceding paragraphs.

The use of the base functions and the discretization prerented in the preceding paragraphs is furthermore to be understood as one advantageous example of applying the inventive concept. For other applications, different base functions as well as different discretizations may also be used. Depending on certain implementation requirements of the inventive methods, the inventive methods can be implemented in hardware or in software. The implementation can be performed using a digital storage medium, in particular a disk, DVD or a CD having electronically readable control signals stored thereon, which cooperate with a programmable computer system such that the inventive methods are performed. Generally, the present invention is, therefore, a computer program product with a program code stored on a machine-readable carrier, the program code being operative for performing the inventive methods when the computer program product runs on a computer. In other words, the inventive methods are, therefore, a computer program having a program code for performing at least one of the inventive methods when the computer program runs on a computer.

While the foregoing has been particularly shown and described with reference to particular embodiments thereof, it will be understood by those skilled in the art that various other changes in the form and details may be made without departing from the spirit and scope thereof. It is to be understood that various changes may be made in adapting to different embodiments without departing from the broader concepts disclosed herein and comprehended by the claims that follow.

The invention claimed is:

1. An encoder for deriving a representation of an audio signal having a first frame, a second frame following the first frame, and a third frame following the second frame, the encoder comprising:

a processor and a non-transitory computer storage medium having stored thereon instructions which, when executed by the processor, cause the processor to function as:

a warp estimator for estimating first warp information for the first and the second frame and for estimating second warp information for the second frame and the third frame, the warp information describing a pitch information of the audio signal;

a spectral analyzer adapted to derive first spectral coefficients for the first and the second frame using the first warp information and a first weighted representation of the first and the second frame, the first weighted representation derived by applying a first window function to the first and the second frames, wherein the first window function depends on the first warp information; the spectral analyzer further adapted to derive second spectral coefficients for the second and the third frame using the second warp information and a second weighted representation of the second and the third frame, the second weighted representation derived by applying a second window function to the second and the third frames, wherein the second window function depends on the second warp information; and an output interface for outputting the representation of the audio signal including the first and the second spectral coefficients.

2. The encoder in accordance with claim 1 in which the warp estimator is operative to estimate the warp information such that a pitch within a warped representation of frames, the warped representation derived from frames transforming the time axis of the audio signal within the frames as indicated by the warp information, is more constant than a pitch within the frames.

3. The encoder in accordance with claim 1, in which the warp estimator is operative to estimate the warp information using information on the variation of the pitch within the frames.

4. The encoder in accordance with claim 3, in which the warp estimator is operative to estimate the warp information such that the information on the variation of the pitch is used only when the pitch variation is lower than a predetermined maximum pitch variation.

5. The encoder in accordance with claim 1, in which the warp estimator is operative to estimate the warp information such that a spectral representation of a warped representation of a frame, the warped representation derived from frames transforming the time axis of the audio signal within the frames as indicated by the warp information, is more sparsely populated than a spectral representation of the frame.

6. The encoder in accordance with claim 1, in which the warp estimator is operative to estimate the warp information such that a number of bits consumed by an encoded representation of spectral coefficients of a warped representation of frames, the warped representation derived from frames transforming the time axis of the audio signal within the frames as indicated by the warp information, is lower than an encoded representation of spectral coefficients of the frames when both representations are derived using the same encoding rule.

7. The encoder in accordance with claim 1, which is adapted to derive a representation of an audio signal given by a sequence of discrete sample values.

8. The encoder in accordance with claim 1, in which the warp estimator is operative to estimate the warp information such that a warped representation of frames, the warped representation derived from frames transforming the time axis of the audio signal within the frames as indicated by the warp information, describes the same length of the audio signal as the corresponding frames.

9. The encoder in accordance with claim 1, in which the warp estimator is operative to estimate the warp information such that first intermediate warp information of a first corresponding frame and second intermediate warp information of a second corresponding frame are combined using a combination rule.

10. The encoder in accordance with claim 9, in which the combination rule is such that rescaled warp parameter sequences of the first intermediate warp information are concatenated with rescaled warp parameter sequences of the second intermediate warp information.

11. The encoder in accordance with claim 10, in which the combination rule is such that the resulting warp information comprises a continuously differentiable warp parameter sequence.

12. The encoder in accordance with claim 1, in which the warp estimator is operative to estimate the warp information such that the warp information comprises an increasing sequence of warp parameters.

13. The encoder in accordance with claim 1, in which the warp estimator is operative to estimate the warp information such that the warp information describes a continuously differentiable resampling rule mapping the interval [0,2] onto itself.

14. The encoder in accordance with claim 1, in which the spectral analyzer is adapted to derive the spectral coefficients using cosine basis depending on the warp information.

15. The encoder in accordance with claim 1, in which the spectral analyzer is adapted to derive the spectral coefficients using a resampled representation of the frames.

16. The encoder in accordance with claim 15, in which the spectral analyzer is further adapted to derive the resampled representation transforming the time axis of the frames as indicated by the warp information.

17. The encoder in accordance with claim 1, in which the warp information derived describes a pitch variation of the audio signal normalized to the pitch of the audio signal.

18. The encoder in accordance with claim 1, in which the warp estimator is operative to estimate the warp information such that the warp information comprises a sequence of warp parameters, wherein each warp parameter describes a finite length interval of the audio signal.

19. The encoder in accordance with claim 1, in which the output interface is operative to further include the warp information.

20. The encoder in accordance with claim 1, in which the output interface is operative to further include a quantized representation of the warp information.

21. The encoder in accordance with claim 1, wherein the spectral analyzer is further adapted to derive the first weighted representation by applying the first window function to the first and the second frames; and wherein the spectral analyzer is further adapted to derive the second weighted representation derived by applying the second window function to the second and the third frames.

22. A decoder for reconstructing an audio signal having a first frame, a second frame following the first frame and a third frame following the second frame, using first warp information, the first warp information describing a pitch information of the audio signal for the first and the second frame, second warp information, the second warp information describing a pitch information of the audio signal for the second and the third frame, first spectral coefficients for the first and the second frame and second spectral coefficients for the second and the third frame, the decoder comprising:

a spectral value processor adapted to derive a first combined frame using the first spectral coefficients and the first warp information, the first combined frame having information on the first and on the second frame; and to use a first window function for applying weights to sample values of the first combined frame, the first window function depending on the first warp information;

the spectral value processor further adapted to derive a second combined frame using the second spectral coefficients and the second warp information, the second combined frame having information on the second and the third frame; and to use a second window function for applying weights to sample values of the second combined frame, the second window function depending on the first warp information; and a synthesizer for reconstructing the second frame using the first combined frame and the second combined frame.

23. The decoder in accordance with claim 22, in which the spectral value processor is adapted to use cosine base functions for deriving the combined frames, the cosine base functions depending on the warp information.

24. The decoder in accordance with claim 23, in which the spectral value processor is adapted to use such cosine base functions, that using the cosine base functions on the spectral coefficients yields a time-warped unweighted representation of a combined frame.

25. The decoder in accordance with claim 24, in which the spectral value processor is adapted to use window functions which, when applied to the time-warped unweighted representation of the combined frames, yield a time-warped representation of the combined frames.

26. The decoder in accordance with claim 22, in which the spectral value processor is operative to use warp information for deriving a combined frame by transforming the time axis of representations of combined frames as indicated by the warp information.

27. The decoder in accordance with claim 22, in which the synthesizer is operative to reconstruct the second frame adding the first combined frame and the second combined frame.

28. The decoder in accordance with claim 22, being adapted to reconstruct an audio signal represented by a sequence of discrete sample values.

29. The decoder in accordance with claim 22, further comprising a warp estimator for deriving the first and the second warp information from the first and the second spectral coefficients.

30. The decoder in accordance with claim 22, in which the spectral value processor is operative to perform a weighting of the spectral coefficients, applying predetermined weighting factors to the spectral coefficients.

31. A method of deriving a representation of an audio signal having a first frame, a second frame following the first frame, and a third frame following the second frame, the method comprising:

estimating first warp information for the first and the second frame and for estimating second warp information for the second frame and the third frame, the warp information describing a pitch information of the audio signal;

deriving first spectral coefficients for the first and the second frame using the first warp information and a first weighted representation of the first and the second frame, the first weighted representation derived by applying a first window function to the first and the second frames, wherein the first window function depends on the first warp information;

deriving second spectral coefficients for the second and the third frame using the second warp information and a second weighted representation of the second and the third frame, the second weighted representation derived by applying a second window function to the second and the third frames, wherein the second window function depends on the second warp information; and outputting the representation of the audio signal including the first and the second spectral coefficients.

32. The method of claim 31, further comprising:

deriving the first weighted representation by applying the first window function to the first and the second frames, wherein the first window function depends on the first warp information; and deriving the second weighted representation by applying the second window function to the second and the third frames, wherein the second window function depends on the second warp information.

33. A method of reconstructing an audio signal having a first frame, a second frame following the first frame and a third frame following the second frame, using first warp information, the first warp information describing a pitch information of the audio signal for the first and the second frame, second warp information, the second warp information describing a pitch information of the audio signal for the second and the third frame, first spectral coefficients for the first and the second frame and second spectral coefficients for the second and the third frame, the method comprising:

deriving a first combined frame using the first spectral coefficients and the first warp information, the first combined frame having information on the first and on the second frame;

using a first window function for applying weights to sample values of the first combined frame, the first window function depending on the first warp information;

deriving a second combined frame using the second spectral coefficients and the second warp information, the second combined frame having information on the second and the third frame;

using a second window function for applying weights to sample values of the second combined frame, the second window function depending on the first warp information; and reconstructing the second frame using the first combined frame and the second combined frame.

34. A non-transitory computer readable digital storage medium having stored thereon a computer program having a program code for performing, when running on a computer, a method for deriving a representation of an audio signal having a first frame, a second frame following the first frame, and a third frame following the second frame, the method comprising:

estimating first warp information for the first and the second frame and for estimating second warp information for the second frame and the third frame, the warp information describing a pitch information of the audio signal;

deriving first spectral coefficients for the first and the second frame using the first warp information and a first weighted representation of the first and the second frame, the first weighted representation derived by applying a first window function to the first and the second frames, wherein the first window function depends on the first warp information;

deriving second spectral coefficients for the second and the third frame using the second warp information and a second weighted representation of the second and the third frame, the second weighted representation derived by applying a second window function to the second and the third frames, wherein the second window function depends on the second warp information; and outputting the representation of the audio signal including the first and the second spectral coefficients.

35. A non-transitory computer readable digital storage medium having stored thereon a computer program having a program code for performing, when running on a computer, a method of reconstructing an audio signal having a first frame, a second frame following the first frame and a third frame following the second frame, using first warp information, the first warp information describing a pitch information of the audio signal for the first and the second frame, second warp information, the second warp information describing a pitch information of the audio signal for the second and the third frame, first spectral coefficients for the first and the second frame and second spectral coefficients for the second and the third frame, the method comprising:

deriving a first combined frame using the first spectral coefficients and the first warp information, the first combined frame having information on the first and on the second frame;

using a first window function for applying weights to sample values of the first combined frame, the first window function depending on the first warp information;

deriving a second combined frame using the second spectral coefficients and the second warp information, the second combined frame having information on the second and the third frame;

using a second window function for applying weights to sample values of the second combined frame, the second window function depending on the first warp information; and reconstructing the second frame using the first combined frame and the second combined frame.

36. An encoder for deriving a representation of an audio signal having a first frame, a second frame following the first frame, and a third frame following the second frame, the encoder comprising:

a processor comprising:

a warp estimator for estimating first warp information for the first and the second frame and for estimating second warp information for the second frame and the third frame, the warp information describing a pitch information of the audio signal;

a spectral analyzer adapted to derive first spectral coefficients for the first and the second frame using the first warp information and a first weighted representation of the first and the second frame, the first weighted representation derived by applying a first window function to the first and the second frames, wherein the first window function depends on the first warp information; the spectral analyzer further adapted to derive second spectral coefficients for the second and the third frame using the second warp information and a second weighted representation of the second and the third frame, the second weighted representation derived by applying a second window function to the second and the third frames, wherein the second window function depends on the second warp information; and an output interface for outputting the representation of the audio signal including the first and the second spectral coefficients.

* * * * *